United States Patent
Pan et al.

(10) Patent No.: US 12,481,615 B2
(45) Date of Patent: Nov. 25, 2025

(54) LINK NEGOTIATION SYSTEM, METHOD, AND DEVICE

(71) Applicant: Huawei Technologies Co., Ltd., Shenzhen (CN)

(72) Inventors: Wei Pan, Shenzhen (CN); Pingyu Wu, Shenzhen (CN); Junping Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 18/405,234

(22) Filed: Jan. 5, 2024

(65) Prior Publication Data

US 2024/0160597 A1 May 16, 2024

Related U.S. Application Data

(63) Continuation of application No. PCT/CN2022/092014, filed on May 10, 2022.

(30) Foreign Application Priority Data

| Jul. 8, 2021 | (CN) | ......................... | 202110770998.3 |
| Sep. 27, 2021 | (CN) | ......................... | 202111134281.6 |

(51) Int. Cl.
  *G06F 13/00* (2006.01)
  *G06F 13/42* (2006.01)
(52) U.S. Cl.
  CPC ................................ *G06F 13/4282* (2013.01)
(58) Field of Classification Search
  None
  See application file for complete search history.

(56) References Cited

U.S. PATENT DOCUMENTS

| 8,566,471 | B1 | 10/2013 | Alecci et al. |
| 2009/0164684 | A1* | 6/2009 | Atherton ............... G06F 13/387 710/300 |
| 2015/0215209 | A1* | 7/2015 | Pirko ...................... H04L 49/30 370/235 |
| 2015/0278040 | A1 | 10/2015 | Sikkink et al. |
| 2016/0087902 | A1* | 3/2016 | Srinivasan ............ H04L 49/118 370/392 |
| 2018/0191570 | A1* | 7/2018 | Rothermel ............ H04L 47/283 |
| 2019/0042524 | A1* | 2/2019 | Das Sharma ....... G06F 13/4282 |
| 2022/0086098 | A1* | 3/2022 | Huang ................... H04L 45/245 |

FOREIGN PATENT DOCUMENTS

| CN | 105978750 A | 9/2016 |
| CN | 115599731 A | 1/2023 |

* cited by examiner

*Primary Examiner* — Henry Tsai
*Assistant Examiner* — Dean Phan
(74) *Attorney, Agent, or Firm* — Conley Rose, P.C.

(57) ABSTRACT

A link negotiation system includes a second device that determines a link configuration policy based on a status of a receiver of an interface of the second device, where the link configuration policy indicates an association relationship between a unidirectional logical lane and a unidirectional physical lane in a high-speed serial link between a first device and the second device, the unidirectional logical lane is a logical lane from the first device to the second device in the high-speed serial link, and the unidirectional physical lane is a physical lane from the first device to the second device in the high-speed serial link; and sends the link configuration policy to the first device.

20 Claims, 9 Drawing Sheets

LINK NEGOTIATION SYSTEM, METHOD, AND DEVICE

CROSS-REFERENCE TO RELATED APPLICATIONS

This is a continuation of International Patent Application No. PCT/CN2022/092014 filed on May 10, 2022, which claims priority to Chinese Patent Application No. 202110770998.3 filed on Jul. 8, 2021 and Chinese Patent Application No. 202111134281.6 filed on Sep. 27, 2021. All of the aforementioned patent applications are hereby incorporated by reference in their entireties.

TECHNICAL FIELD

This disclosure relates to the field of communication technologies, and in particular, to a link negotiation system, method, and device.

BACKGROUND

Before data is formally transmitted on a high-speed serial link represented by a Peripheral Component Interconnect Express (PCIe), the high-speed serial link needs to be trained. The training process is mainly a negotiation process between two devices connected through the high-speed serial link. In the PCIe, the two devices need to determine a link width of the high-speed serial link and negotiate a high-speed serial link number and a logical lane number during training.

However, during specific implementation, if the two devices find that a physical lane is abnormal, the entire high-speed serial link may fail to complete the training process, and subsequently data cannot be normally transmitted.

SUMMARY

This disclosure provides a link negotiation system, method, and device, to flexibly establish an association relationship between a logical lane and a physical lane in a high-speed serial link.

According to a first aspect, an embodiment of this disclosure provides a link negotiation system. The system includes a first device and a second device. A high-speed serial link may be established between the first device and the second device. The high-speed serial link connects an interface of the first device and an interface of the second device. The interface in the second device may be referred to as a second interface, and the interface in the first device may be referred to as a first interface.

The second device can determine a status of each receiver of the second interface, for example, whether the receiver is normal or abnormal. The second device may determine a link configuration policy based on a status of a receiver of the second interface. The link configuration policy indicates an association relationship between a unidirectional logical lane (or a forward logical lane in embodiments of this disclosure) and a unidirectional physical lane (or a forward physical lane in embodiments of this disclosure) in the high-speed serial link between the first device and the second device. The unidirectional logical lane is a logical lane from the first device to the second device in the high-speed serial link, and the unidirectional physical lane is a physical lane from the first device to the second device in the high-speed serial link.

After determining the link configuration policy, the second device may send the link configuration policy to the first device. After receiving the link configuration policy, the first device configures the high-speed serial link according to the link configuration policy, that is, establishes the association relationship between a physical lane and a logical lane on the first device side.

According to the foregoing system, the second device can indicate, based on the status of the receiver of the second interface, the first device to establish the association relationship between a physical lane and a logical lane on the first device side. Because the status of the receiver of the second device is a key factor for determining whether the unidirectional physical lane is really normal, the link configuration policy determined based on the status of the receiver of the second interface can ensure that an association relationship can be established between the unidirectional logical lane and a normal unidirectional physical lane, and ensure validity of the link configuration policy. In this way, the establishment of the association relationship between a physical lane and a logical lane on the first device side can meet the status of the receiver of the second interface, and the establishment of the association relationship between a physical lane and a logical lane on the first device side is more flexible.

In a possible implementation, for the first device, there may be a certain limitation on a unidirectional physical lane on which different unidirectional logical lanes are allowed to be positioned, especially for a unidirectional logical lane that is ranked first in the unidirectional logical lanes. Therefore, the first device may notify the second device of a unidirectional physical lane on which the unidirectional logical lane is allowed to be positioned.

Further, the first device may send a logical lane positioning message to the second device, where the logical lane positioning message may be expressed in the following two forms.

In the first form, the logical lane positioning message includes a unidirectional physical lane on which a target unidirectional logical lane is allowed to be positioned, where the target unidirectional logical lane (or a target forward logical lane in embodiments of this disclosure) is a unidirectional logical lane that is ranked first in the high-speed serial link.

In the second form, the logical lane positioning message includes a unidirectional physical lane on which a plurality of unidirectional logical lanes is allowed to be positioned.

According to the foregoing system, a manner in which the first device notifies the second device of the unidirectional physical lane on which the unidirectional logical lane is allowed to be positioned is flexible, and is applicable to different scenarios.

In a possible implementation, if the second device receives the logical lane positioning message, when determining the link configuration policy, the second device may determine the link configuration policy based on the status of the receiver of the second interface and the logical lane positioning message.

According to the foregoing system, the link configuration policy can not only meet the status of the receiver of the second device, but also meet the logical lane positioning message, thereby further ensuring validity of the link configuration policy.

In a possible implementation, the link configuration policy may be expressed in a plurality of specific forms. For example, the link configuration policy may include some or all of the following:

1. a unidirectional physical lane on which the target unidirectional logical lane is positioned;
2. a link width of the high-speed serial link, where the link width is the maximum link width supported by a current normal unidirectional physical lane; and
3. an ascending order of numbers of unidirectional logical lanes in the high-speed serial link follows an ascending order of numbers of unidirectional physical lanes or is opposite to the ascending order of the numbers of the unidirectional physical lanes, namely, a configuration direction of the unidirectional logical lane numbers.

According to the foregoing system, the association relationship between a unidirectional physical lane and a unidirectional logical lane is limited by limiting the unidirectional physical lane on which the target unidirectional logical lane is positioned, the link width, and the configuration direction of the unidirectional logical lane numbers, so that a message form of the link configuration policy is simpler.

In a possible implementation, if the second device does not receive the logical lane positioning message, the second device may also send one or more link configuration policies to the first device based on the status of the receiver of the second interface.

According to the foregoing system, the second device may alternatively actively provide an available link configuration policy for the first device, to ensure that the association relationship between a unidirectional physical lane and a unidirectional logical lane can be established on the first device side.

In a possible implementation, when the first device receives a plurality of link configuration policies, the first device may select a link configuration policy from the plurality of first link configuration policies, and configure the high-speed serial link according to the selected link configuration policy.

According to the foregoing system, the first device can select a link configuration policy according to an actual situation, to ensure that the association relationship between a unidirectional physical lane and a unidirectional logical lane can be successfully established subsequently.

In a possible implementation, the foregoing is mainly for the unidirectional logical lane from the first device to the second device, and the association relationship between a unidirectional physical lane and a unidirectional logical lane is established on the first device side. Similarly, for a unidirectional logical lane from the second device to the first device, an association relationship between a unidirectional physical lane and a unidirectional logical lane can also be established on the second device side. The first device includes a first interface. The first device may determine a peer link configuration policy based on a status of a receiver of the first interface, and send the peer link configuration policy to the second device. The peer link configuration policy indicates an association relationship between a first logical lane (or a reverse logical lane in embodiments of this disclosure) and a first physical lane (or a reverse physical lane in embodiments of this disclosure) in the high-speed serial link between the first device and the second device. The first logical lane is a logical lane from the second device to the first device in the high-speed serial link, and the first physical lane is a physical lane from the second device to the first device in the high-speed serial link.

After receiving the peer link configuration policy, the second device configures the high-speed serial link according to the peer link configuration policy, that is, establishes the association relationship between a physical lane and a logical lane on the second device side.

According to the foregoing system, the first device may also indicate, in a similar manner based on the status of the receiver of the second interface, the first device to establish the association relationship between a physical lane and a logical lane on the first device side. In this way, the establishment of the association relationship between a physical lane and a logical lane from the first device to the second device and the establishment of the association relationship between a physical lane and a logical lane from the second device to the first device are independent, and the establishment of the association relationship between a physical lane and a logical lane in the entire high-speed serial link is more flexible.

According to a second aspect, an embodiment of this disclosure provides a link negotiation method. The method may be performed by a first device. For descriptions of beneficial effects, refer to the descriptions of the first aspect. Details are not described herein again.

The first device may receive a link configuration policy from a second device, where the link configuration policy indicates an association relationship between a unidirectional logical lane and a unidirectional physical lane in a high-speed serial link between the first device and the second device. The unidirectional logical lane is a logical lane from the first device to the second device in the high-speed serial link, and the unidirectional physical lane is a physical lane from the first device to the second device in the high-speed serial link. After receiving the link configuration policy, the first device may configure the high-speed serial link according to the link configuration policy.

In a possible implementation, before receiving the link configuration policy from the second device, the first device may further send a logical lane positioning message to the second device. The logical lane positioning message may be expressed in the following two forms.

In the first form, the logical lane positioning message includes a unidirectional physical lane on which a target unidirectional logical lane is allowed to be positioned, where the target unidirectional logical lane is a unidirectional logical lane that is ranked first in the high-speed serial link.

In the second form, the logical lane positioning message includes a unidirectional physical lane on which a plurality of unidirectional logical lanes is allowed to be positioned.

In a possible implementation, the link configuration policy may include some or all of the following: a unidirectional physical lane on which the target unidirectional logical lane is positioned, a link width of the high-speed serial link, and an ascending order of numbers of unidirectional logical lanes in the high-speed serial link follows an ascending order of numbers of unidirectional physical lanes or is opposite to the ascending order of the numbers of the unidirectional physical lanes.

In a possible implementation, the first device may receive one or more link configuration policies.

In a possible implementation, when receiving a plurality of link configuration policies, the first device selects a link configuration policy from the plurality of first link configuration policies, and configures the high-speed serial link according to the selected link configuration policy.

In a possible implementation, the first device includes a first interface, and the first device may determine a peer link configuration policy based on a status of a receiver of the first interface, and send the peer link configuration policy to the second device. The peer link configuration policy indicates an association relationship between a first logical lane and a first physical lane in the high-speed serial link between the first device and the second device, where the first logical lane is a logical lane from the second device to the first device in the high-speed serial link, and the first physical lane is a physical lane from the second device to the first device in the high-speed serial link.

According to a third aspect, an embodiment of this disclosure provides a link negotiation method. The method may be performed by a second device. For beneficial effects, refer to related descriptions of the first aspect. Details are not described herein again. The second device includes a second interface, and a high-speed serial link between the second device and a first device is established based on the second interface.

The second device may determine a link configuration policy based on a status of a receiver of the second interface, where the link configuration policy indicates an association relationship between a unidirectional logical lane and a unidirectional physical lane in the high-speed serial link between the first device and the second device. The unidirectional logical lane is a logical lane from the first device to the second device in the high-speed serial link, and the unidirectional physical lane is a physical lane from the first device to the second device in the high-speed serial link. After determining the link configuration policy, the second device may send the link configuration policy to the first device.

In a possible implementation, before determining the link configuration policy based on the status of the receiver of the second interface, the second device may further receive a logical lane positioning message from the first device. The logical lane positioning message may be expressed in the following two forms.

In the first form, the logical lane positioning message includes a unidirectional physical lane on which a target unidirectional logical lane is allowed to be positioned, where the target unidirectional logical lane is a unidirectional logical lane that is ranked first in the high-speed serial link.

In the second form, the logical lane positioning message includes a unidirectional physical lane on which a plurality of unidirectional logical lanes is allowed to be positioned.

In a possible implementation, if the second device receives the logical lane positioning information, when determining the link configuration policy based on the status of the receiver of the second interface, the second device may determine the link configuration policy based on the status of the receiver of the second interface and the logical lane positioning message.

In a possible implementation, the link configuration policy includes some or all of the following: a unidirectional physical lane on which the target unidirectional logical lane is positioned, a link width of the high-speed serial link, and an ascending order of numbers of unidirectional logical lanes in the high-speed serial link follows an ascending order of numbers of unidirectional physical lanes or is opposite to the ascending order of the numbers of the unidirectional physical lanes.

In a possible implementation, the second device may determine one or more link configuration policies based on the status of the receiver of the second interface, and send the one or more link configuration policies to the first device.

In a possible implementation, the second device may receive a peer link configuration policy from the first device, where the peer link configuration policy indicates an association relationship between a first logical lane and a first physical lane in the high-speed serial link between the first device and the second device. The first logical lane is a logical lane from the second device to the first device in the high-speed serial link, and the first physical lane is a physical lane from the second device to the first device in the high-speed serial link. The high-speed serial link may then be configured based on the peer link configuration policy.

According to a fourth aspect, an embodiment of this disclosure further provides a link negotiation apparatus. The negotiation apparatus has a function of implementing behavior of the first device in the method instance in the second aspect. For beneficial effects, refer to the description of the first aspect. Details are not described herein again. The function may be implemented by hardware, or may be implemented by executing corresponding software by hardware. The hardware or software includes one or more modules corresponding to the foregoing functions. In a possible design, a structure of the apparatus includes a receiving module and a configuration module, and optionally, further includes a sending module. These modules may perform corresponding functions in the method example in the second aspect. For details, refer to detailed descriptions in the method example. Details are not described herein again.

According to a fifth aspect, an embodiment of this disclosure further provides a link negotiation apparatus. The evaluation apparatus has a function of implementing behavior of the second device in the method instance in the third aspect. For beneficial effects, refer to the description of the first aspect. Details are not described herein again. The function may be implemented by hardware, or may be implemented by executing corresponding software by hardware. The hardware or software includes one or more modules corresponding to the foregoing functions. In a possible design, a structure of the apparatus includes a configuration module and a sending module, and optionally, further includes a receiving module. These modules may perform corresponding functions in the method example in the third aspect. For details, refer to detailed descriptions in the method example. Details are not described herein again.

According to a sixth aspect, an embodiment of this disclosure further provides a computing device. The computing device has a function of implementing behavior of the first device in the method instance of the second aspect. For beneficial effects, refer to the description of the first aspect. Details are not described herein again. A structure of the computing device includes a processor and a storage (an internal memory or an internal memory and an external memory such as a hard disk). The processor is configured to support the evaluation apparatus in performing a corresponding function in the method in the second aspect. The storage is coupled to the processor, and stores program instructions and data that are necessary for the computing device. The structure of the computing device further includes a communication interface (namely, the first interface described in the method embodiment) configured to communicate with another device, for example, may receive a link configuration policy, send a logical lane positioning message, and send a peer link configuration policy.

According to a seventh aspect, an embodiment of this disclosure further provides a computing device. The computing device has a function of implementing behavior of the second device in the method instance of the third aspect. For beneficial effects, refer to the description of the first aspect. Details are not described herein again. A structure of the computing device includes a processor and a storage (an internal memory or an internal memory and an external memory such as a hard disk). The processor is configured to support the evaluation apparatus in performing a corresponding function in the method in the third aspect. The storage is coupled to the processor, and stores program instructions and data that are necessary for the computing device. The structure of the computing device further includes a communication interface (namely, the second interface described in the method embodiment) configured to communicate with another device, for example, may send a link configuration policy, receive a logical lane positioning message, and receive a peer link configuration policy.

According to an eighth aspect, this disclosure further provides a computer-readable storage medium. The computer-readable storage medium stores instructions, and when the instructions are run on a computer, the computer is enabled to perform the method in the second aspect and the possible implementations of the second aspect. Alternatively, when the instructions are run on the computer, the computer is enabled to perform the method in the third aspect and the possible implementations of the third aspect.

According to a ninth aspect, this disclosure further provides a computer program product including instructions. When the instructions are run on a computer, the computer is enabled to perform the method in the second aspect and the possible implementations of the second aspect. Alternatively, when the instructions are run on the computer, the computer is enabled to perform the method in the third aspect and the possible implementations of the third aspect.

According to a tenth aspect, this disclosure further provides a computer chip, where the chip is connected to a storage, and the chip is configured to read and execute a software program stored in the storage, to perform the method in the second aspect and the possible implementations of the second aspect. Alternatively, the chip is configured to read and execute the software program stored in the storage, to perform the method in the third aspect and the possible implementations of the third aspect.

DESCRIPTION OF EMBODIMENTS

Figure 1:
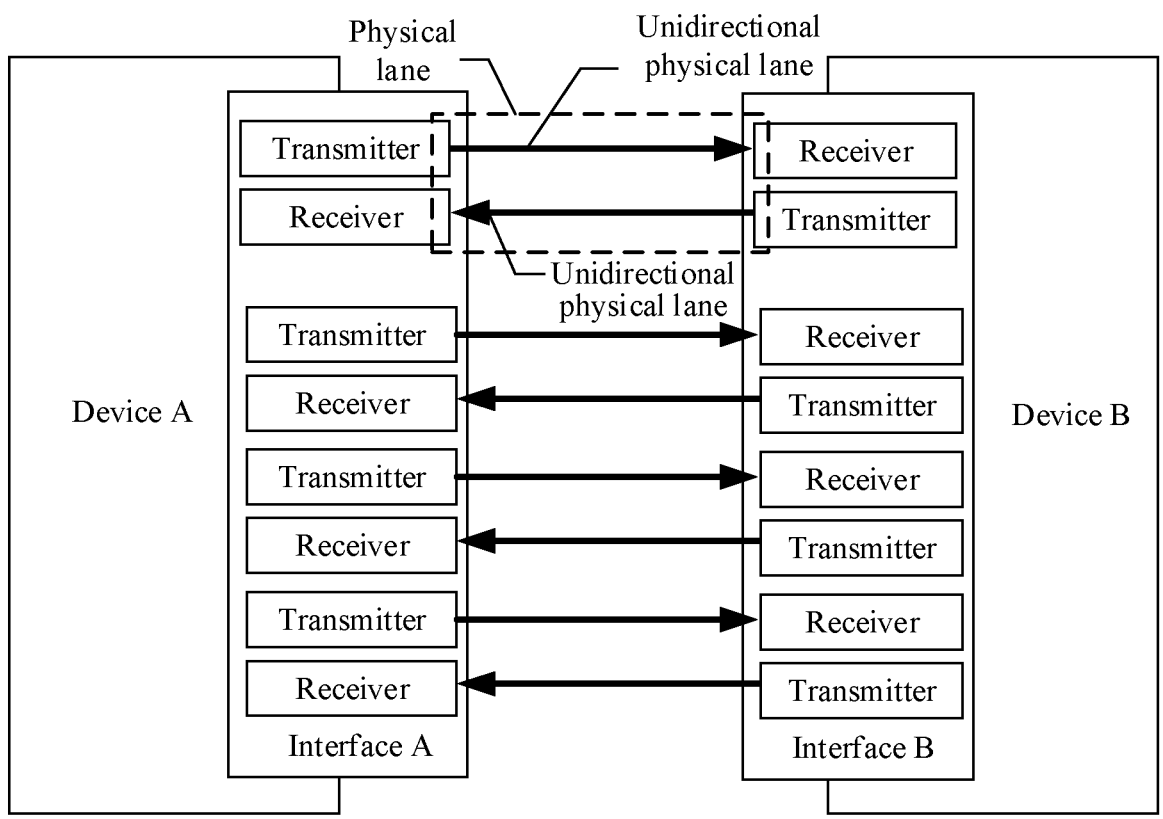
FIG. 1 is a schematic diagram of a connection relationship between devices.

FIG. 1 shows two devices connected through a high-speed serial communication link, where a device A has an interface A, and a device B includes an interface B. A high-speed serial link may be established between the interface A and the interface B.

Generally, the interface A of the device A includes a specific quantity of receivers and transmitters. The interface B of the device B also includes a specific quantity of receivers and transmitters. The receiver of the interface A and the transmitter of the interface B may be connected through a signal cable, and the transmitter of the interface A and the receiver of the interface B may be connected through a signal cable.

The high-speed serial link between the interface A and the interface B includes one or more physical lanes. One physical lane includes two unidirectional physical lanes, where one unidirectional physical lane is a lane from a transmitter of the interface A to a receiver of the interface B. The unidirectional physical lane may be established through a signal cable between the transmitter of the interface A and the receiver of the interface B. In this way, it may be understood that the unidirectional physical lane is a physical lane from the device A to the device B, and there is a transmitter of the interface A and a receiver of the interface B on the unidirectional physical lane. The other unidirectional physical lane is a lane from a transmitter of the interface B to a receiver of the interface A. The unidirectional physical lane may be established through a signal cable between the transmitter of the interface B and the receiver of the interface A. In this way, it is understood that the unidirectional physical lane is a physical lane from the device B to the device A, and there is a receiver of the interface A and a transmitter of the interface B on the unidirectional physical lane.

Each physical lane and each unidirectional physical lane between the interface A and the interface B may be identified by using physical lane numbers. Generally, a physical lane number is pre-configured and does not change. The physical lane number may be increased from 0. For ease of description, a physical lane number may be identified as a P-lane number, and physical lane numbers between the interface A and the interface B are P-lane 0, P-lane 1, P-lane 2, and P-lane 3 respectively. A physical lane number of a unidirectional physical lane may be considered the same as that of a physical lane to which the unidirectional physical lane belongs.

In FIG. 1, an example in which the interface A and the interface B each include four receivers and four transmitters is used. In this way, the high-speed serial link between the interface A and the interface B includes four physical lanes.

To enable the high-speed serial link to work normally, link negotiation is required first. Herein, an example in which the high-speed serial communication link is PCIe is used to describe a link negotiation process.

The link negotiation may be implemented through a link training and status state machine (LTSSM). The link negotiation needs to sequentially undergo phases such as a detection phase, a polling phase, a configuration phase, and an L0 phase.

Detection phase: The device A and the device B each send a signal (for example, a pulse signal) to the device on the peer side through a transmitter in the respective interface, to detect whether a receiver exists in the interface of the device on the peer side. The device A is used as an example. The device A sends a pulse signal to the device B through each physical lane by using each transmitter of the interface A, and the device A determines, by detecting a status of the sent pulse signal, whether a receiver exists in the device B or whether a function of the receiver is normal. If the device A detects that no receiver exists in the interface of the device B, a physical lane on which the receiver should be located does not enter a next phase.

Polling phase: In the polling phase, the device A and the device B can send detection code streams to each other through respective interfaces to determine whether each physical lane is normal.

Determining whether the first physical lane is normal is used as an example. The device A sends a detection code stream T1 to the device B through the first physical lane (namely, through a unidirectional physical lane from the interface of the device A to the interface of the device B in the first physical lane) through the interface A. The detection code stream T1 carries related information of the interface A of the device A, for example, a supported transmission rate and a negotiation mode. If the device B successfully receives the detection code stream T1 through the interface B, the device B may determine that the first physical lane (namely, the unidirectional physical lane from the interface of the device A to the interface of the device B) works normally. The device B sends a detection code stream T2 to the device B through the first physical lane (namely, a unidirectional physical lane from the interface of the device B to the interface of the device A in the first physical lane) through the interface A. The detection code stream T2 carries related information of the interface B of the device B, for example, a supported transmission rate and a negotiation mode. The device A successfully receives the detection code stream T2 through the interface A. The device A may determine that the first physical lane (namely, another unidirectional physical lane from the interface of the device B to the interface of the device A) works normally. If the device B does not receive the detection code stream T1 through the interface B, the device B may determine that the first physical lane is abnormal, and does not feed back the detection code stream T2 to the device A. The device A may also determine that the first physical lane is abnormal. In this case, if the device B receives the detection code stream T1 through the interface B, but the transmitter of the interface B on the first physical lane is abnormal, the device B cannot feed back the detection code stream T2 to the device A, and the device A also determines that the first physical lane is abnormal. The physical lane determined to be abnormal does not enter the configuration phase. It can be seen that, in the polling phase, two unidirectional physical lanes in the physical lane are bound. In other words, as long as one unidirectional physical lane is abnormal, even if the other unidirectional physical lane is normal, the physical lane to which the unidirectional physical lanes belong cannot participate in the next phase as a whole.

Configuration phase: In the configuration phase, the device A and the device B negotiate, through a physical lane that works normally, a link width of the high-speed serial link between the device A and the device B (where the link width of the high-speed serial link is not greater than a quantity of physical lanes that are determined to be normal) and a logical lane number of each physical lane in the high-speed serial link.

There are various choices for the link width of the high-speed serial link, for example, the link width may be x1, x2, x4, x8, x16, or x32. A number after x represents a quantity of physical lanes in the high-speed serial link. The link width of the high-speed serial link that is determined through negotiation between the device A and the device B is a link width that can be supported by a quantity of normal physical lanes.

The logical lane is oriented to an upper layer of a physical layer of the device A and the device B. In other words, if service data needs to be sent in the device A and the device B, the upper layer of the physical layer may specify which logical lane is used to send the service data. For example, a logical lane number may be used to indicate which logical lane is used to send the service data. The physical layer in the device A and the device B may find an associated physical lane by using the logical lane number, and send the service data through the physical lane.

For example, the high-speed serial link is PCIe. In the configuration phase, an association relationship between a physical lane and a logical lane needs to be established, to ensure that the device A and the device B can subsequently perform normal communication through each physical lane in the high-speed serial link. In the configuration phase in the PCIe standard, a logical lane number may be configured for each physical lane by defining whether a logical lane that is ranked first is positioned on the first physical lane or the last physical lane in the high-speed serial link. For ease of description, the logical lane number may be identified as an L-lane number, and logical lane numbers between the interface A and the interface B are L-lane 0, L-lane 1, L-lane 2, and L-lane 3 respectively.

For example, in the configuration phase, the device A may send a detection sequence TS1 to the device B, where the TS1 indicates that the logical lane that is ranked first is positioned on the first physical lane in the high-speed serial link. After receiving the TS1 sequence, if the device B determines that the logical lane that is ranked first can be located on the first physical lane in the high-speed serial link, the device B sends the TS2 sequence to the device A, to notify the device A that the logical lane that is ranked first can be positioned on the first physical lane in the high-speed serial link. In this way, an ascending order of the logical lane numbers is consistent with an ascending order of the physical lane numbers, that is, L-lane 0=P-lane 0, L-lane 1=P-lane 1, L-lane 2=P-lane 2, and L-lane 3=P-lane 3. After receiving the TS1 sequence, if the device B determines, based on setting of the device B, that the logical lane that is ranked first cannot be located on the first physical lane in the high-speed serial link, the device B sends the detection sequence TS2 to the device A, to notify the device A that the logical lane that is ranked first can only be located on the last physical lane in the high-speed serial link, and negotiates with the device A through the detection sequence TS2. In this way, the ascending order of the logical lane numbers is opposite to the ascending order of the physical lane numbers, that is, L-lane 0=P-lane 3, L-lane 1=P-lane 2, L-lane 2=P-lane 1, and L-lane 3=P-lane 0.

In embodiments of this disclosure, positioning is to establish an association relationship. For example, if a logical lane that is ranked first is positioned on the first physical lane in the high-speed serial link, it indicates that the logical lane that is ranked first has an association relationship with the first physical lane.

After the configuration phase ends, the L0 phase can be entered.

L0 phase: L0 is a phase in which the high-speed serial link starts to work normally.

It should be noted that the foregoing merely lists some phases of link negotiation performed by the LTSSM.

It can be learned from the foregoing description that, when the device A or the device B determines, in the detection phase, that the peer device does not have a receiver, a physical lane on which the receiver should be located does not participate in a next phase, and the physical lane is not used for data transmission subsequently. In the polling phase, if it is determined that a physical lane is abnormal, even if only some unidirectional physical lanes are abnormal, the physical lane does not participate in the next phase. In addition, when the association relationship between a physical lane and a logical lane is established in the configuration phase, the logical lane that is ranked first can only be positioned on the first physical lane or the last physical lane. In this way, if it is determined that a receiver on the first physical lane or the last physical lane does not exist in the detection phase, or it is determined that the first physical lane or the last physical lane is abnormal in the polling phase, the logical lane that is ranked first cannot be positioned on the first physical lane or the last physical lane, and an association relationship between a physical lane and a logical lane cannot be successfully established in the configuration phase, or an association relationship between a physical lane and a logical lane established in the configuration phase cannot reuse a normal physical lane, thereby reducing utilization of the physical lane. It can be learned that, in the existing negotiation process, an association relationship between a physical lane and a logical lane is established in a mechanical manner, and utilization of the physical lane is low.

To flexibly and effectively establish an association relationship between a physical lane and a logical lane, and ensure utilization of the physical lane, embodiments of this disclosure provide a link negotiation system, method, and device.

Figure 2:
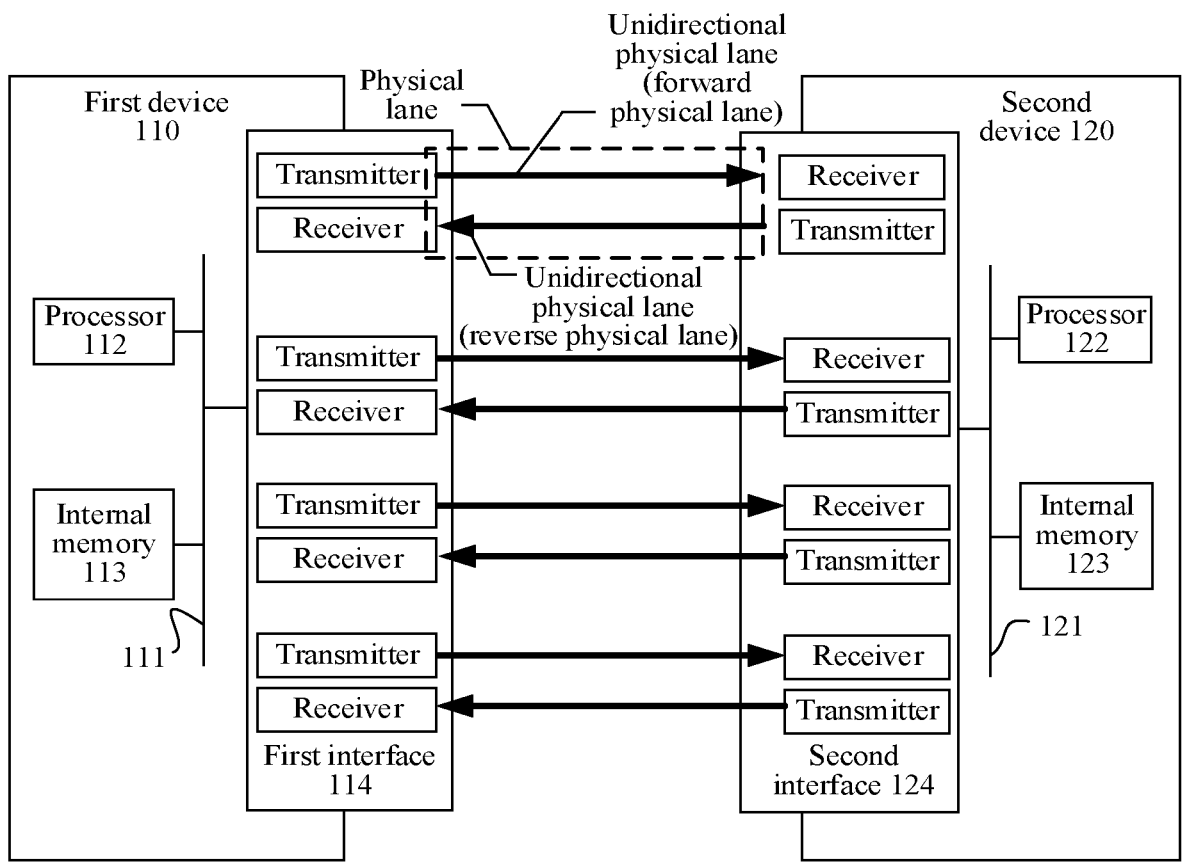
FIG. 2 is a schematic diagram of a structure of a link negotiation system according to this disclosure.

As shown in FIG. 2, an embodiment of this disclosure provides a link negotiation system. The system includes a first device 110 and a second device 120. The first device 110 includes a first interface 114, and the second device 120 includes a second interface 124.

The first interface 114 includes one or more receivers and transmitters, where quantities of the receivers and the transmitters may be the same or different.

The second interface 124 includes one or more receivers and transmitters, where quantities of the receivers and the transmitters may be equal or different.

Between the first interface 114 and the second interface 124, the receiver of the first interface 114 may be connected to the transmitter of the second interface 124 through a signal cable, and the transmitter of the first interface 114 may be connected to the receiver of the second interface 124 through a signal cable.

A physical connection between the first device 110 and the second device 120 may be formed by connecting a signal cable between the first interface 114 and the second interface 124, that is, a physical lane between the first interface 114 and the second interface 124 is established, to form a high-speed serial link between the first interface 114 and the second interface 124. A type of the high-speed serial link is not limited in this disclosure. The high-speed serial link may be PCIe, or may be a Serial Advanced Technology Attachment (SATA) bus, or may be another type of high-speed serial link.

After the physical lane is established between the first device 110 and the second device 120, the first device 110 and the second device 120 may perform link negotiation, to determine a link bandwidth of the high-speed serial link and establish an association relationship between a physical lane and a logical lane.

In this embodiment of this disclosure, the association relationship between a physical lane and a logical lane may include an association relationship between a unidirectional physical lane and a unidirectional logical lane from the first device 110 to the second device 120, and an association relationship between a unidirectional physical lane and a unidirectional logical lane from the second device 120 to the first device 110.

For ease of description, the unidirectional physical lane from the first device 110 to the second device 120 and the unidirectional logical lane from the first device 110 to the second device 120 are referred to as a forward physical lane and a forward logical lane. The unidirectional physical lane from the second device 120 to the first device 110 and the unidirectional logical lane from the second device 120 to the first device 110 are referred to as a reverse physical lane and a reverse logical lane. It should be understood that the "forward" and the "reverse" herein are merely intended to facilitate distinguishing between two different unidirectional channels (for example, a unidirectional physical lane or a unidirectional logical lane). In actual application, a direction of a unidirectional physical lane is not specially distinguished between "forward" and "reverse".

In a process of establishing an association relationship between a forward physical lane and a forward logical lane, the following method is performed.

The second device 120 may provide a link configuration policy for the first device 110 with reference to a status of each receiver of the second interface 124 (for example, whether a function of a receiver is normal or whether a receiver exists on the forward physical lane). The link configuration policy indicates the association relationship between a forward physical lane and a forward logical lane. In other words, the second device 120 may explicitly notify the first device 110 of how to configure each forward logical lane, and for any forward logical lane, which forward physical lane can be associated with the forward logical lane.

After receiving the link configuration policy, the first device 110 may configure the high-speed serial link between the first device 110 and the second device 120 according to the link configuration policy, and establish the association relationship between a forward physical lane and a forward logical lane.

In this embodiment of this disclosure, a forward logical lane that is ranked first is allowed to be positioned on any forward physical lane. A specific forward physical lane or forward physical lanes on which positioning is allowed is related to an internal implementation capability of the first interface 114 in the first device 110. The first device 110 may send a logical lane positioning message to the second device 120 before the second device 120 determines the link configuration policy, where the logical lane positioning information indicates a forward physical lane on which a forward logical lane is allowed to be positioned, and includes a forward physical lane on which a forward logical lane that is ranked first is allowed to be positioned. In this way, the second device 120 can determine the link configuration policy based on a status of each receiver of the second interface 124 and the logical lane positioning information.

In a process of establishing an association relationship between a reverse physical lane and a reverse logical lane, the following method is performed.

The first device 110 may provide a peer link configuration policy for the second device 120 with reference to a status of each receiver of the first interface 114 (for example, whether a function of a receiver is normal or whether a receiver exists on the reverse physical lane). The peer link configuration policy indicates the association relationship between a reverse physical lane and a reverse logical lane. In other words, the first device 110 may explicitly notify the second device 120 of how to configure each reverse logical lane, and for any reverse logical lane, which reverse physical lane can be associated with the reverse logical lane.

After receiving the peer link configuration policy, the second device 120 may configure the high-speed serial link between the first device 110 and the second device 120 according to the peer link configuration policy, and establish the association relationship between a reverse physical lane and a reverse logical lane.

In this embodiment of this disclosure, a reverse logical lane that is ranked first is allowed to be positioned on any forward physical lane. A specific reverse physical lane or reverse physical lanes on which positioning is allowed is related to internal implementation of the second interface 124 in the second device 120. Before the first device 110 determines the peer link configuration policy, the second device 120 may send a peer logical lane positioning message to the first device 110, where the peer logical lane positioning information indicates a reverse physical lane on which a reverse logical lane is allowed to be positioned, and includes a reverse physical lane on which a first reverse logical lane is allowed to be positioned. In this way, the first device 110 can determine the peer link configuration policy based on a status of each receiver of the first interface 114 and the second logical lane positioning information.

The following describes internal structures of the first device 110 and the second device 120.

The first device is used as an example. The first device includes a processor 112, an internal memory 113, and a first interface 114. The processor 112, the internal memory 113, and the first interface 114 communicate with each other through a bus 111.

The processor 112 may be a central processing unit (CPU), or the processor 112 may be another general purpose processor, a digital signal processor (DSP), an application-specific integrated circuit (ASIC), a field-programmable gate array (FPGA) or another programmable logic device, a discrete gate or transistor logic device, a discrete hardware component, an artificial intelligence chip, an on-chip chip, or the like. The general-purpose processor may be a microprocessor, any conventional processor, or the like.

The internal memory 113 may include a volatile memory, for example, a random-access memory (RAM) or a dynamic RAM (DRAM), or may be a non-volatile memory, for example, a storage class memory (SCM), or a combination of a volatile memory and a non-volatile memory.

The internal memory 113 may further include another software module required for running a process, such as an operating system. The operating system may be Linux™, Unix™ Windows™, or the like.

The first interface 114 may be a high-speed serial interface, and the first interface 114 may include a transmitter and a receiver. The first interface 114 may be configured to communicate with the second device.

Steps performed by the first device in the link negotiation method provided in this embodiment of this disclosure may be performed by the processor 112. In other words, the processor 112 may invoke computer executable instructions stored in the internal memory 113 to perform the link negotiation method provided in this embodiment of this disclosure.

The second device 120 includes a processor 122, an internal memory 123, and a second interface 124. The processor 122, the internal memory 123, and the second interface 124 communicate with each other through a bus 121. The processor 122, the internal memory 123, and the second interface 124 are similar to the processor 112, the internal memory 113, and the first interface 114. For details, refer to the foregoing descriptions. Details are not described herein again.

Steps performed by the second device 120 in the link negotiation method provided in this embodiment of this disclosure may be performed by the processor 122. In other words, the processor 122 may invoke computer executable instructions stored in the internal memory 123 to perform the link negotiation method provided in this embodiment of this disclosure.

It should be noted that specific forms of the first device 110 and the second device 120 are not limited in embodiments of this disclosure. For example, the first device 110 and the second device 120 may be two modules in a same computing device, or may be two different computing devices. Any device that can establish a connection through a high-speed serial link is applicable to embodiments of this disclosure. In addition, in embodiments of this disclosure, only an example in which the high-speed serial link is PCIe is used for description. For another type of high-speed serial link, the link negotiation method provided in embodiments of this disclosure is also applicable. However, in specific implementation, there may be differences in terms of a trigger occasion, a phase name, and the like. The basic principle is similar, and does not depart from the protection scope claimed in this disclosure.

Figure 3:
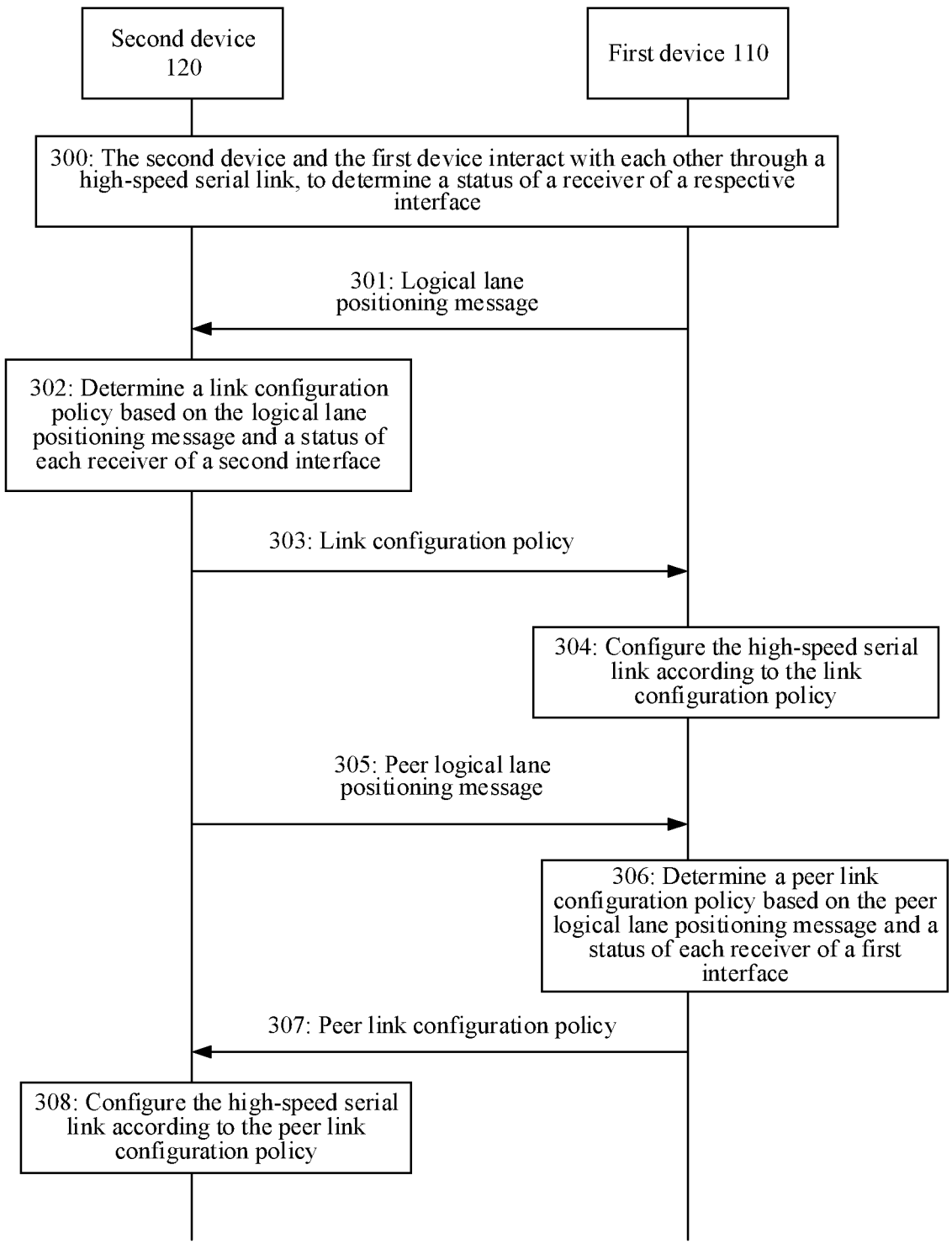
FIG. 3 is a schematic diagram of a link negotiation method according to this disclosure.

FIG. 3 shows a link negotiation method according to an embodiment of this disclosure. The method is used to establish an association relationship between a physical lane and a logical lane in a high-speed serial link between a first device 110 and a second device 120. The method may be divided into two procedures. One procedure is that the first device 110 interacts with the second device 120 to determine an association relationship between a forward physical lane and a forward logical lane (refer to step 301 to step 303). The other procedure is that the first device 110 interacts with the second device 120 to determine an association relationship between a reverse physical lane and a reverse logical lane (refer to step 304 to step 306). The two procedures are independent of each other and do not affect each other. An execution sequence of the two procedures is not limited in this disclosure, and the two procedures may alternatively be performed synchronously.

Step 300: The second device 120 and the first device 110 interact with each other through a high-speed serial link, to determine a status of a receiver of a respective interface.

When the high-speed serial link is PCIe, for an execution manner of step 300, refer to the manner of interaction between the device A and the device B in the detection phase in the foregoing content.

The first device 110 is used as an example. The first device 110 may send a detection pulse to the second device 120 through a forward physical lane on which each transmitter is located by using each transmitter of the first interface 114. The first device 110 determines a receiver status of the peer device (namely, the second device 120) based on a change of the sent detection pulse, for example, determines whether there is a receiver of the second interface 124 of the second device 120. The second device 120 may also determine a status of each interface in the second interface 124 based on whether each interface in the second interface 124 receives the detection pulse sent by the first device 110 in the detection phase or whether each interface can accurately identify the received detection pulse. For example, if the second device 120 receives, in the detection phase through the first forward physical lane, the detection pulse sent by the first device 110, and the received detection pulse is clear and easy to identify, the second device 120 may determine that the receiver on the first forward physical lane in the second interface 124 is normal. If the second device 120 receives, in the detection phase through the first forward physical lane, the detection pulse sent by the first device 110, but the received detection pulse is fuzzy and difficult to identify or cannot be identified, the second device 120 may determine that the receiver on the first forward physical lane in the second interface 124 is abnormal. If the second device 120 does not receive, in the detection phase through the first forward physical lane, the detection pulse sent by the first device 110, the second device 120 may determine that no receiver exists on the first forward physical lane of the second interface 124 or the receiver cannot work.

The second device 120 may also send a detection pulse in a similar manner, and the first device 110 may determine a status of each receiver of the first interface 114 based on a receiving status of the detection pulse.

The foregoing enumerated manner is merely one of the manners. This disclosure does not limit a specific manner in which the second device 120 and the first device 110 interact with each other through the high-speed serial link to determine a status of a receiver of a respective interface.

Step 301: The first device 110 sends a logical lane positioning message to the second device 120, where the logical lane positioning message carries a forward logical lane positioning policy, and the forward logical lane positioning policy indicates a forward physical lane on which a forward logical lane is allowed to be positioned.

A specific indication manner of the forward logical lane positioning policy is not limited herein.

For example, in the forward logical lane positioning policy, one forward physical lane set is configured for each forward logical lane. In other words, one forward logical lane corresponds to one forward physical lane set. For any forward logical lane, a forward physical lane set corresponding to the forward logical lane may indicate one or more forward physical lanes on which the forward logical lane is allowed to be positioned.

Information recorded in the forward physical lane set is not limited in this disclosure. The forward physical lane set corresponding to the forward logical lane may record physical lane numbers of one or more forward physical lanes on which the forward logical lane is allowed to be positioned, for example, record L-lane m={P-lane y1, . . . , P-lane yn}, where m is a forward logical lane number, and y1 to yn are forward physical lane numbers. The forward physical lane set corresponding to the forward logical lane may also record identifiers of transmitters (Rx) (namely, transmitters in the first interface 114) on one or more forward physical lanes on which the forward logical lane is allowed to be positioned, for example, record L-lane x={Rx q1, . . . , Rx qn}, where q1 to qn are the identifiers of the transmitters on the forward physical lanes. The forward physical lane set corresponding to the forward logical lane may further record identifiers of receivers (Tx) (namely, receivers in the second interface 124) on one or more forward physical lanes on which the forward logical lane is allowed to be positioned, for example, record L-lane x={Tx p1, . . . , Tx pn}, where p1 to pn are the identifiers of the receivers on the forward physical lanes. In some scenarios, the physical lane numbers of the forward physical lanes, the transmitter identifiers of the forward physical lanes, and the receiver identifiers of the forward physical lanes may be consistent.

For another example, the forward logical lanes may be set in ascending or descending order of physical lane numbers of forward physical lanes. For example, when it is determined that a first forward logical lane (or a forward logical lane that is ranked first) is positioned on a second forward physical lane, that is, L-lane 0=P-lane 1, forward logical lanes after the first forward logical lane are one-to-one associated with reverse physical lanes after the second forward physical lane, that is, L-lane 1=P-lane 2, L-lane 2=P-lane 3, L-lane 3=P-lane 4, and so on. Therefore, as long as the forward physical lane on which the first forward logical lane is allowed to be positioned is determined, after the forward physical lane on which the first forward logical lane is positioned is determined, a manner of setting other forward logical lanes may be basically determined. Based on this, an indication manner of the forward logical lane positioning policy is provided. To be specific, the forward logical lane positioning policy may indicate only the forward physical lane on which the first forward logical lane is allowed to be positioned. In the forward logical lane positioning policy, a forward physical lane set is configured for the first forward logical lane, that is, the first forward logical lane corresponds to the forward physical lane set. For ease of description, the first forward logical lane may be referred to as a target forward logical lane, or may be marked as L-lane 0. The forward logical lane positioning policy may configure a forward physical lane set for a target forward logical lane, and the forward physical lane set corresponding to the target forward logical lane may indicate one or more forward physical lanes on which the target forward logical lane is allowed to be positioned.

Information recorded in the forward physical lane set is not limited in this disclosure. The forward physical lane set may record physical lane numbers of one or more forward physical lanes on which the target forward logical lane is allowed to be positioned, for example, record L-lane 0={P-lane y1, . . . , P-lane yn}, where y1 to yn are forward physical lane numbers. The forward physical lane set may also record identifiers of transmitters (1Rx) (namely, transmitters in the first interface 114) on one or more forward physical lanes on which the target forward logical lane is allowed to be positioned, for example, record L-lane 0={Rx q1, . . . , Rx qn}, where q1 to qn are the identifiers of the transmitters on the forward physical lanes. The forward physical lane set may further record identifiers of receivers (2Tx) (namely, receivers in the second interface 124) on one or more forward physical lanes on which the target forward logical lane is allowed to be positioned, for example, record L-lane 0={Tx p1, . . . , Tx pn}, where p1 to pn are the identifiers of the receivers on the forward physical lanes. In some scenarios, the physical lane numbers of the forward physical lanes, the transmitter identifiers of the forward physical lanes, and the receiver identifiers of the forward physical lanes may be consistent.

If the high-speed serial link between the first device 110 and the second device 120 is PCIe, when step 301 is performed, the logical lane positioning message may be carried in a TS_1 message that is sent by each transmitter in the first interface 114 of the first device 110 to the second device 120 in the polling phase.

For any transmitter 1Rx i of the first interface 114 of the first device 110, the TS_1 message sent by the transmitter may include the following two pieces of information:

Information 1: a physical lane number of a forward physical lane on which the transmitter is located, for example, carrying P-lane number=i.

Information 2: Whether the target forward logical lane is allowed to be positioned on the forward physical lane on which the transmitter is located, where is L-lane 0 option=1 or 0, where 1 indicates that the target forward logical lane is allowed to be positioned on the forward physical lane on which the transmitter is located, and 0 indicates that the target forward logical lane is not allowed to be positioned on the forward physical lane on which the transmitter is located.

For example, there are 16 forward physical lanes in the high-speed serial link between the first device 110 and the second device 120. It is assumed that the target forward logical lane is allowed to be positioned on the first, the fourth, the fifth, the eighth, the ninth, the twelfth, the thirteenth, and the sixteenth forward physical lanes, that is, allowed to be positioned on P-lane 0, P-lane 3, P-lane 4, P-lane 7, P-lane 8, P-lane 11, P-lane 12, and P-lane 15.

Therefore, TS_1 messages sent by the first, fourth, fifth, eighth, ninth, twelfth, thirteenth, and sixteenth transmitters 1Rx i (i=0, 3, 4, 7, 8, 11, 12, 15) in the first interface 114 of the first device 110 indicate whether the target forward logical lane is allowed to be positioned on the forward physical lane on which the transmitter is located, and TS_1 messages sent by other transmitters 1Rx i (i=1, 2, 5, 6, 9, 10, 13, 14) indicate whether the target forward logical lane is not allowed to be positioned on the forward physical lane on which the transmitter is located.

Step 302: The second device 120 receives the logical lane positioning message, and determines the link configuration policy based on the logical lane positioning message and the status of each receiver of the second interface 124, where the link configuration policy indicates the association relationship between a forward logical lane and a forward physical lane.

When determining the link configuration policy, the second device 120 considers a status of a forward physical lane (where the status refers to whether the forward physical lane is normal). For the second device 120, if the receiver on the forward physical lane is normal, the second device 120 may determine that the forward physical lane is normal, or if the receiver on the forward physical lane is abnormal, the second device 120 may determine that the forward physical lane is abnormal. The status of the forward physical lane may be determined based on a status of each receiver of the second interface 124.

The second device 120 needs to ensure that a forward physical lane associated with any forward logical lane can work normally. In other words, a forward physical lane on which a receiver that can work normally in the second interface 124 is located needs to be selected. The second device 120 may further consider establishing an association between as many forward physical lanes as possible that can work normally and forward logical lanes.

It should be noted that, when determining the link configuration policy, in addition to the logical lane positioning message and the status of each receiver of the second interface 124, the second device 120 may further consider a receiver that can be used as a receiving end of the target forward logical lane in the second interface 124. The second interface 124 of the second device 120 may allow any receiver to be used as a receiving end of the target forward logical lane, or allow some receivers to be used as receiving ends of the target forward logical lane. For a receiver that is not allowed to be used as a receiving end of the target forward logical lane, a forward physical lane on which the receiver is located is not allowed to have an association relationship with the target forward logical lane. Therefore, when the link configuration policy is determined, the forward physical lane associated with the target forward logical lane indicated by the link configuration policy is different from the forward physical lane on which the receiver that is not allowed to be used as the target forward logical lane is located. In actual application, a receiver that can be used as a receiving end of the target forward logical lane and that is in the second interface 124 may be pre-configured, or may be set by a user.

A specific indication manner of the link configuration policy is not limited in embodiments of this disclosure.

Manner 1: The link configuration policy may indicate a forward physical lane on which any forward logical lane is positioned. In principle, different forward logical lanes are not allowed to be positioned on the same forward physical lane. Because the second device 120 combines the status of each receiver of the second interface 124, a receiver on a forward physical lane on which any forward logical lane is positioned is normal, that is, the forward physical lane is normal.

If a forward physical lane set is configured for each forward logical lane in the forward logical lane positioning policy, a forward physical lane on which any forward logical lane is positioned is selected from the forward physical lane set corresponding to the forward logical lane. In this case, it is allowed that forward logical lanes may not be set in ascending or descending order of physical lane numbers of the forward physical lanes. In other words, any forward logical lane is not affected by a forward logical lane with an adjacent logical lane number, and different forward logical lanes only need to be associated with different forward physical lanes.

If the forward logical lane positioning policy indicates a forward physical lane on which the target forward logical lane is allowed to be positioned, the forward logical lanes generally need to be set in ascending or descending order of physical lane numbers of the forward physical lanes. A forward physical lane on which any forward logical lane is positioned is determined according to an ascending or descending order of forward physical lane numbers after the forward physical lane on which the target forward logical lane is allowed to be positioned is determined.

Figure 4A:
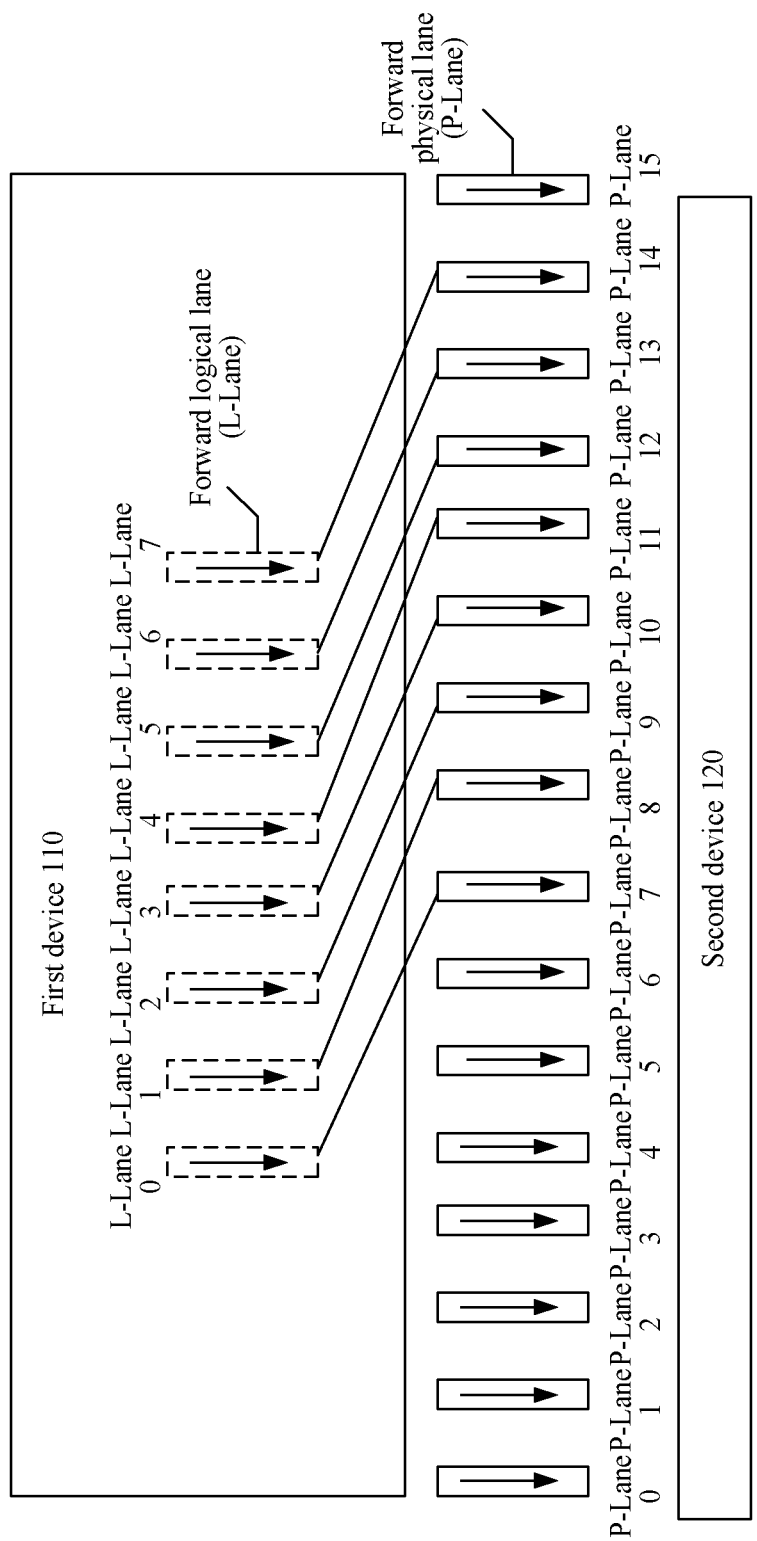
FIG. 4A and FIG. 4B are schematic diagrams of an association relationship between a forward logical lane and a forward physical lane according to this disclosure.
Figure 4B:
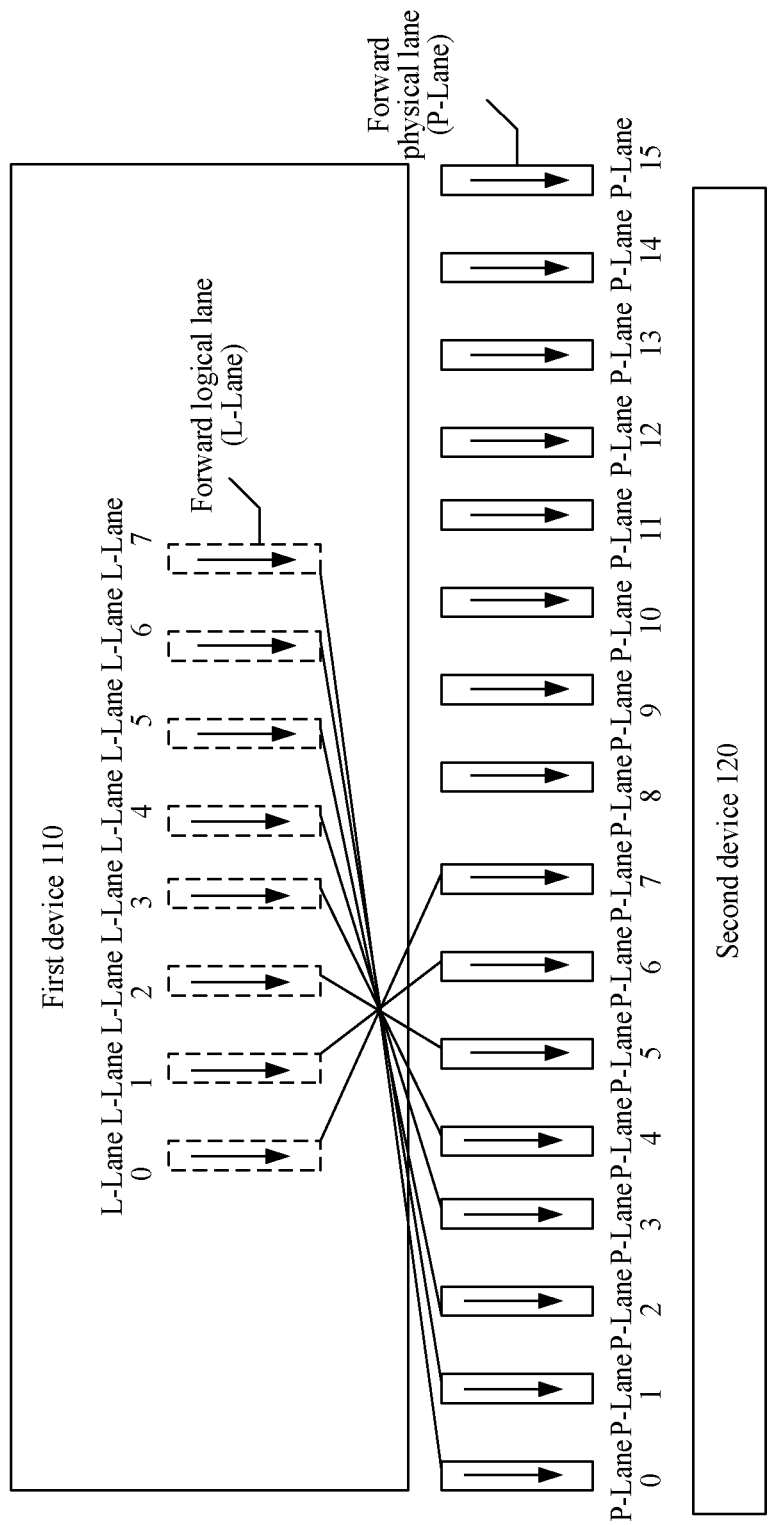

For example, as shown in FIG. 4A, the high-speed serial link has 16 forward physical lanes. When it is determined that the target forward logical lane is positioned the eighth forward physical lane, that is, L-lane 0=P-lane 7, forward logical lanes after the first forward logical lane may be one-to-one associated with forward physical lanes after the eighth forward physical lane, that is, L-lane 1=P-lane 7, L-lane 2=P-lane 8, L-lane 3=P-lane 9, . . . , and L-lane 7=P-lane 14. As shown in FIG. 4B, the forward logical lanes after the first forward logical lane may also be one-to-one associated with the forward physical lanes before the eighth forward physical lane, that is, L-lane 1=P-lane 6, L-lane 2=P-lane 5, L-lane 3=P-lane 4, . . . , and L-lane 7=P-lane 0.

Figure 5:
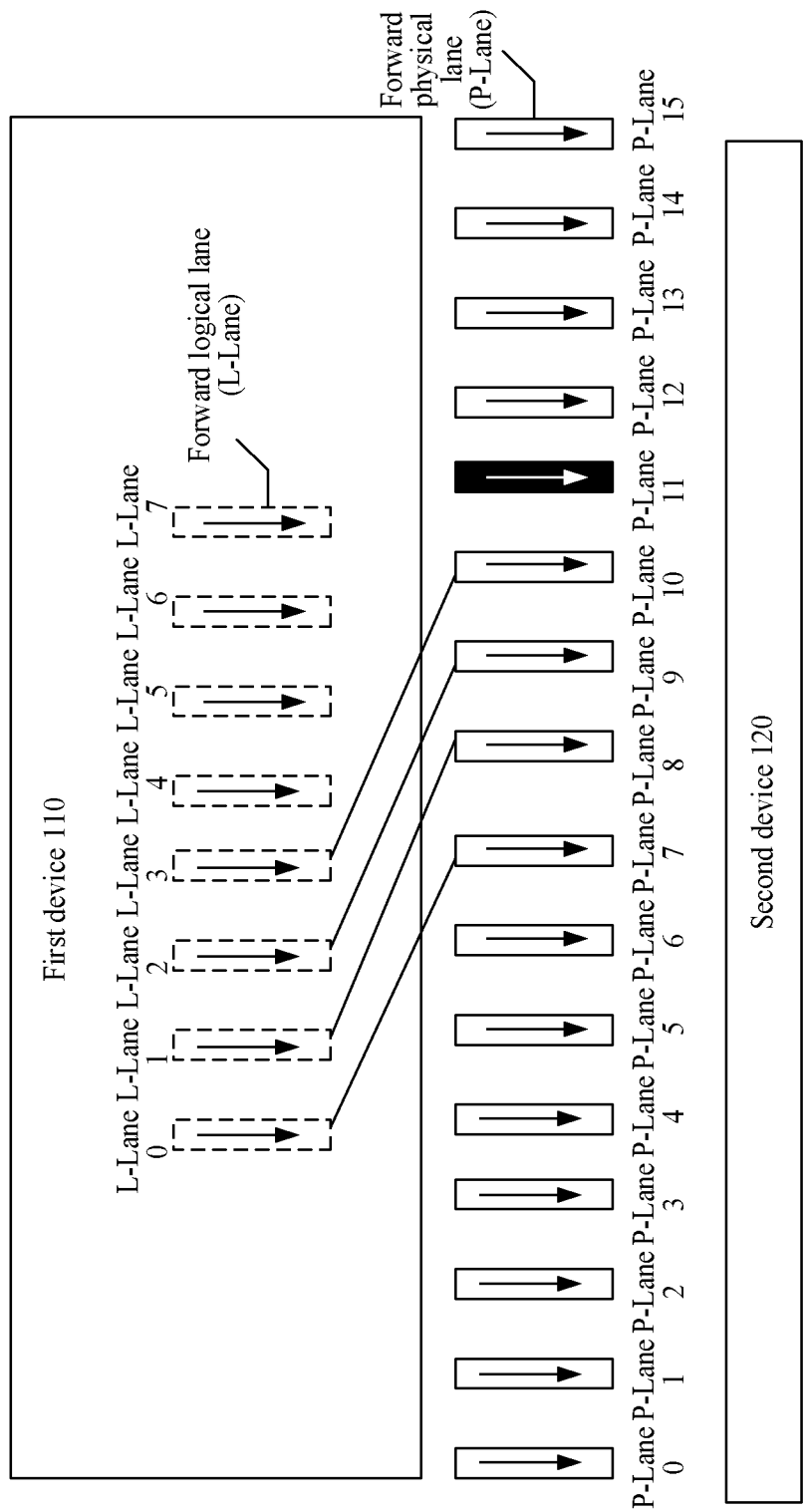
FIG. 5 is a schematic diagram of an association relationship between a forward logical lane and a forward physical lane according to this disclosure.

It should be noted that, in this case, whether the forward logical lanes are set in ascending order of the physical lane numbers of the forward physical lanes or in descending order of the physical lane numbers of the forward physical lanes needs to be considered with reference to statuses of the forward physical lanes. Still using the foregoing setting as an example, if an abnormal forward physical lane exists in the forward physical lanes after the eighth forward physical lane, as shown in FIG. 5, for example, the twelfth forward physical lane (P-lane 11) is abnormal, the forward logical lanes after the first forward logical lane may be one-to-one associated with the forward physical lanes after the eighth forward physical lane and before the twelfth forward physical lane, that is, L-lane 0=P-lane 7, L-lane 1=P-lane 8, L-lane 2=P-lane 9, and L-lane 3=P-lane 10. In this case, a link bandwidth of the high-speed serial link that can be supported is 4. If all forward physical lanes before the eighth forward physical lane are normal, forward logical lanes after the first forward logical lane may be one-to-one associated with forward physical lanes before the eighth forward physical lane, that is, L-lane 1=P-lane 6, L-lane 2=P-lane 5, L-lane 3=P-lane 4, ... , and L-lane 7=P-lane 0. In this case, a link bandwidth of the high-speed serial link that can be supported is 8. The second device 120 may preferentially select a configuration manner that can maximize the supported link bandwidth of the high-speed serial link.

Manner 2: When the forward logical lanes need to be set in ascending or descending order of the physical lane numbers of the forward physical lanes, the link configuration policy may indicate a forward physical lane on which the target forward logical lane is positioned, a supported link bandwidth of the high-speed serial link, and a setting direction of the forward logical lanes, where the setting direction indicates that the physical lane numbers of the forward physical lanes on which the forward logical lanes ranked according to logical lane numbers are positioned are in ascending or descending order.

If a forward physical lane set is configured for each forward logical lane in the forward logical lane positioning policy, a forward physical lane on which the target forward logical lane is positioned is selected from the forward physical lane set corresponding to the target forward logical lane. The physical lane numbers of the forward physical lanes on which the forward logical lanes ranked according to logical lane numbers are positioned are in ascending or descending order. In addition, with reference to a status of each forward physical lane, the second device 120 may preferentially select a setting manner that can maximize the supported link bandwidth.

If the forward logical lane positioning policy indicates a forward physical lane on which the target forward logical lane is allowed to be positioned, the forward physical lane on which the target forward logical lane is positioned is selected from the forward physical lanes on which the target forward logical lane is allowed to be positioned. In addition, with reference to a status of each forward physical lane, the second device 120 may preferentially select a setting manner that can maximize the supported link bandwidth.

For descriptions of the preferentially selecting, by the second device 120, a configuration manner that can maximize the supported link bandwidth of the high-speed serial link, refer to the foregoing content. Details are not described herein again.

If the high-speed serial link between the first device 110 and the second device 120 is PCIe, when step 302 is performed, the link configuration policy may be carried in a TS_2 message that is sent by each transmitter in the second interface 124 of the second device 120 to the first device 110 in the polling phase.

For any transmitter 2Rx i of the second interface 124 of the second device 120, the TS_2 message sent by the transmitter may include the following four pieces of information:

Information 1: a physical lane number of a reverse physical lane on which the transmitter is located, for example, carrying P-lane number=i. The information 1 is information that needs to be included in the TS_2 message in the existing polling phase.

Information 2: a forward physical lane P-lane K on which the target forward logical lane is located. L-lane 0=P-lane K, Rx K, or Tx K. Rx K is an identifier of a transmitter on the forward physical lane P-lane K, namely, an identifier of a transmitter in the first interface 114. Tx K is an identifier of a receiver on the forward physical lane P-lane K, namely, an identifier of a receiver of the second interface 124.

Information 3: a supported link bandwidth R of the high-speed serial link. Linkwidth[index]=R, where index is an identifier of the high-speed serial link.

Information 4: a setting direction of the forward logical lanes, indicating that physical lane numbers of the forward physical lanes on which the forward logical lanes are positioned are in ascending or descending order. In other words, the setting direction of the forward logical lane indicates whether the forward logical lane numbers are sequentially set starting from the target forward logical lane in an ascending direction of the physical lane numbers of the forward physical lanes or in a descending direction of the physical lane numbers of the forward physical lanes. A physical lane number of the forward physical lane on which the transmitter is located is Direction[index]=0/1, where 0 may indicate that the setting is performed in an ascending direction of the physical lane numbers, and the finally set ascending direction of the logical lane numbers of the forward logical lanes is consistent with the ascending direction of the physical lane numbers of the forward physical lanes. For example, L-lane 0=P-lane 6, L-lane 1=P-lane 7, L-lane 2=P-lane 8, L-lane 3=P-lane 9, and L-lane 4=P-lane 10. In this setting manner, the ascending direction of the logical lane numbers of the forward logical lanes is consistent with the ascending direction of the physical lane numbers of the forward physical lanes.

1 may indicate that the setting is performed in a descending direction of the physical lane numbers, and the finally set ascending direction of the logical lane numbers of the forward logical lanes is opposite to the ascending direction of the logical lane numbers of the forward physical lanes. For example, L-lane 0=P-lane 7, L-lane 1=P-lane 6, L-lane 2=P-lane 5, and L-lane 3=P-lane 4. In this setting manner, the ascending direction of the logical lane numbers of the forward logical lanes is opposite to the ascending direction of the logical lane numbers of the forward physical lanes.

The TS_2 messages sent by the foregoing transmitters are the same except that the information 1 is different. In this manner of setting the TS_2 message, even if there is an abnormal transmitter in the second device 120, it can be ensured that the second device 120 sends the link configuration policy to the first device 110 through another normal transmitter.

It should be noted that, in a specific implementation process, the first device 110 is allowed not to perform step 301, that is, the first device 110 may not send the logical lane positioning message to the second device 120. In other words, the second device 120 may directly determine the link configuration policy based on the status of each interface in the second interface 124. Because the second device 120 cannot learn of a forward physical lane on which the target forward logical lane is allowed to be positioned, the second device 120 may determine a plurality of link configuration policies, and each link configuration policy is determined when it is assumed that the target forward logical lane is positioned on a forward physical lane. The plurality of link configuration policies is a plurality of different link configuration policies. A quantity of link configuration policies determined by the second device 120 is not limited in embodiments of this disclosure.

Step 303: The second device 120 sends the link configuration policy to the first device 110. In embodiments of this disclosure, sending, by the second device 120, the link configuration policy to the first device 110 is not limited. For example, the link configuration policy may be carried in the TS_2 message in the polling phase, and is transmitted by attaching to a message existing in an existing interaction procedure. For another example, the second device 120 and the first device 110 may set a new message to carry the link configuration policy.

Step 304: The first device 110 configures the high-speed serial link between the first device 110 and the second device 120 according to the link configuration policy.

The first device 110 may configure an association relationship between a forward logical lane and a forward physical lane in the high-speed serial link according to the link configuration policy.

It should be noted that, in a specific implementation process, if the second device 120 sends a plurality of link configuration policies to the first device 110, the first device 110 may select one link configuration policy from the plurality of link configuration policies, and configure the association relationship between a forward logical lane and a forward physical lane in the high-speed serial link according to the selected link configuration policy. For example, the first device 110 may select one link configuration policy from the plurality of link configuration policies based on a forward physical lane on which the target forward logical lane is allowed to be positioned.

In this way, the association relationship between a forward logical lane and a forward physical lane is established between the first device 110 and the second device 120. An association relationship between a reverse logical lane and a reverse physical lane may also be established between the second device 120 and the first device 110 in a similar manner. For details, refer to the following steps. A difference from steps 301 to 304 lies in that roles of the first device 110 and the second device 120 are exchanged. In the following steps, the second device 120 may send a second logical lane positioning message to the first device 110, and the first device 110 may provide a peer link configuration policy for the second device 120.

Step 305: The second device 120 sends a peer logical lane positioning message to the first device 110, where the peer logical lane positioning message carries a reverse logical lane positioning policy, and the reverse logical lane positioning policy indicates a reverse physical lane on which a reverse logical lane is allowed to be positioned.

A specific indication manner of the reverse logical lane positioning policy is not limited herein.

For example, in the reverse logical lane positioning policy, one reverse physical lane set is configured for each reverse logical lane. In other words, one reverse logical lane corresponds to one reverse physical lane set. For any reverse logical lane, a reverse physical lane set corresponding to the reverse logical lane may indicate one or more reverse physical lanes on which the reverse logical lane is allowed to be positioned.

Information recorded in the reverse physical lane set is not limited in this disclosure. The reverse physical lane set corresponding to the reverse logical lane may record physical lane numbers of one or more reverse physical lanes on which the reverse logical lane is allowed to be positioned. The reverse physical lane set corresponding to the reverse logical lane may also record identifiers of transmitters (Rx) (namely, transmitters in the second interface 124) on one or more reverse physical lanes on which the reverse logical lane is allowed to be positioned. The reverse physical lane set corresponding to the reverse logical lane may further record identifiers of receivers (Tx) (namely, receivers in the first interface 114) on one or more reverse physical lanes on which the reverse logical lane is allowed to be positioned. In some scenarios, the physical lane numbers of the reverse physical lanes, the transmitter identifiers of the reverse physical lanes, and the receiver identifiers of the reverse physical lanes may be consistent.

For another example, the reverse logical lane positioning policy may indicate only a reverse physical lane (namely, a reverse logical lane that is ranked first) on which a first reverse logical lane is allowed to be positioned. In the reverse logical lane positioning policy, a reverse physical lane set is configured for the first reverse logical lane, that is, one reverse logical lane corresponds to one reverse physical lane set. For ease of description, the first reverse logical lane may be referred to as a target reverse logical lane, or may be marked as L-lane 0. The reverse logical lane positioning policy may configure a reverse physical lane set for a target reverse logical lane, and the reverse physical lane set corresponding to the target reverse logical lane may indicate one or more reverse physical lanes on which the target reverse logical lane is allowed to be positioned.

Information recorded in the reverse physical lane set is not limited in this disclosure. The reverse physical lane set may record physical lane numbers of one or more reverse physical lanes on which the target reverse logical lane is allowed to be positioned. The reverse physical lane set may also record identifiers of transmitters (2Rx) (namely, transmitters in the second interface 124) on one or more reverse physical lanes on which the target reverse logical lane is allowed to be positioned. The reverse physical lane set may further record identifiers of receivers (1Tx) (namely, receivers in the first interface 114) on one or more reverse physical lanes on which the target reverse logical lane is allowed to be positioned. In some scenarios, the physical lane numbers of the reverse physical lanes, the transmitter identifiers of the reverse physical lanes, and the receiver identifiers of the reverse physical lanes may be consistent.

If the high-speed serial link between the second device 120 and the first device 110 is PCIe, when step 301 is performed, the second logical lane positioning message may be carried in a TS_1 message that is sent by each transmitter in the second interface 124 of the second device 120 to the first device 110 in the polling phase.

For any transmitter 2Rx i of the second interface 124 of the second device 120, the TS_1 message sent by the transmitter may include the following two pieces of information:

Information 1: a physical lane number of a reverse physical lane on which the transmitter is located, for example, carrying P-lane number=i.

Information 2: Whether the target reverse logical lane is allowed to be positioned on the reverse physical lane on which the transmitter is located, where is L-lane 0 option=1 or 0, where 1 indicates that the target reverse logical lane is allowed to be positioned on the reverse physical lane on which the transmitter is located, and 0 indicates that the target reverse logical lane is not allowed to be positioned on the reverse physical lane on which the transmitter is located.

For example, there are 16 reverse physical lanes in the high-speed serial link between the second device 120 and the first device 110. It is assumed that the target reverse logical lane is allowed to be positioned on the second, the fourth, the fifth, the eighth, the ninth, the twelfth, the thirteenth, and the sixteenth reverse physical lanes, that is, allowed to be positioned on P-lane 0, P-lane 3, P-lane 4, P-lane 7, P-lane 8, P-lane 11, P-lane 12, and P-lane 15.

Therefore, TS_1 messages sent by the second, fourth, fifth, eighth, ninth, twelfth, thirteenth, and sixteenth transmitters 2Rx i (i=0, 3, 4, 7, 8, 11, 12, 15) in the second interface 124 of the second device 120 indicate whether the target reverse logical lane is allowed to be positioned on the reverse physical lane on which the transmitter is located, and TS_1 messages sent by other transmitters 2Rx i (i=1, 2, 5, 6, 9, 10, 13, 14) indicate whether the target reverse logical lane is not allowed to be positioned on the reverse physical lane on which the transmitter is located.

Step 306: The first device 110 receives the second logical lane positioning message, and determines the peer link configuration policy based on the second logical lane positioning message and the status of each receiver of the first interface 114, where the peer link configuration policy indicates an association relationship between a reverse logical lane and a reverse physical lane.

When determining the peer link configuration policy, the first device 110 considers a status of a reverse physical lane (where the status refers to whether the reverse physical lane is normal). For the first device 110, if the receiver on the reverse physical lane is normal, the first device 110 may determine that the reverse physical lane is normal, or if the receiver on the reverse physical lane is abnormal, the first device 110 may determine that the reverse physical lane is abnormal. The status of the reverse physical lane may be determined based on a status of each receiver of the first interface 114.

The first device 110 needs to ensure that a reverse physical lane associated with any reverse logical lane can work normally. In other words, a reverse physical lane on which a receiver that can work normally in the first interface 114 is located needs to be selected. The first device 110 may further consider establishing an association between as many reverse physical lanes as possible that can work normally and reverse logical lanes.

It should be noted that, when determining the peer link configuration policy, in addition to the logical lane positioning message and the status of each receiver of the first interface 114, the first device 110 may further consider a receiver that can be used as a receiving end of the target reverse logical lane in the first interface 114. The first interface 114 of the first device 110 may allow any receiver to be used as a receiving end of the target reverse logical lane, or allow some receivers to be used as receiving ends of the target reverse logical lane. For a receiver that is not allowed to be used as a receiving end of the target reverse logical lane, a reverse physical lane on which the receiver is located is not allowed to have an association relationship with the target reverse logical lane. Therefore, when the peer link configuration policy is determined, the reverse physical lane associated with the target reverse logical lane indicated by the peer link configuration policy is different from the reverse physical lane on which the receiver that is not allowed to be used as the target reverse logical lane is located. In actual application, a receiver that can be used as a receiving end of the target reverse logical lane and that is in the first interface 114 may be pre-configured, or may be set by a user.

A specific indication manner of the peer link configuration policy is not limited in embodiments of this disclosure.

Manner 1: The peer link configuration policy may indicate a reverse physical lane on which any reverse logical lane is positioned. In principle, different single logical lanes are not allowed to be positioned on the same single physical lane. Because the first device 110 combines the status of each receiver of the first interface 114, a receiver on a reverse physical lane on which any reverse logical lane is positioned is normal, that is, the reverse physical lane is normal.

If a reverse physical lane set is configured for each reverse logical lane in the reverse logical lane positioning policy, a reverse physical lane on which any reverse logical lane is positioned is selected from the reverse physical lane set corresponding to the reverse logical lane. In this case, it is allowed that reverse logical lanes may not be set in ascending or descending order of physical lane numbers of the reverse physical lanes. In other words, any reverse logical lane is not affected by a reverse logical lane with an adjacent logical lane number, and different reverse logical lanes only need to be associated with different reverse physical lanes.

If the reverse logical lane positioning policy indicates a reverse physical lane on which the target reverse logical lane is allowed to be positioned, the reverse logical lanes generally need to be set in ascending or descending order of physical lane numbers of the reverse physical lanes. A reverse physical lane on which any reverse logical lane is positioned is determined according to an ascending or descending order of reverse physical lane numbers after the reverse physical lane on which the target reverse logical lane is allowed to be positioned is determined.

Figure 6A:
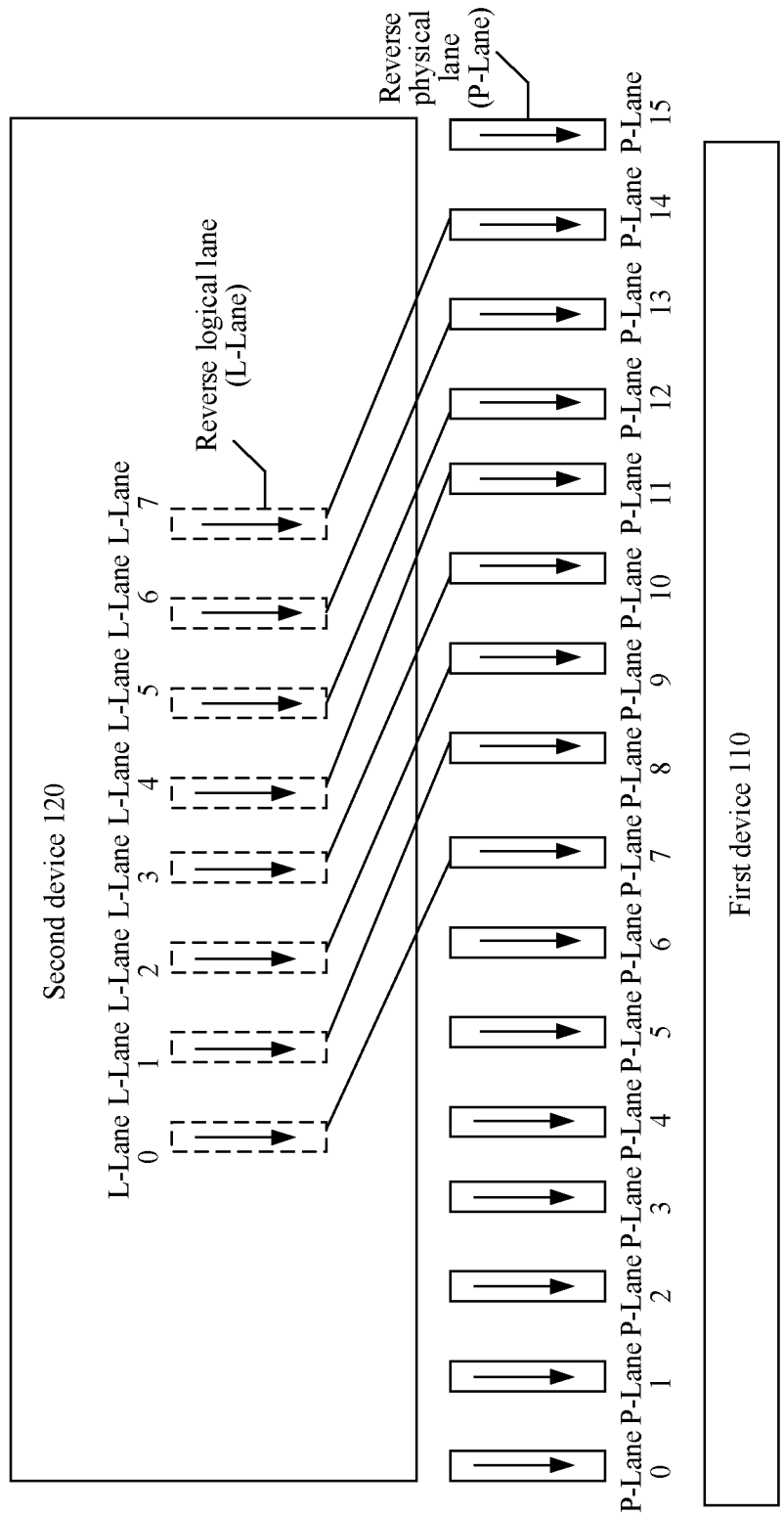
FIG. 6A and FIG. 6B are schematic diagrams of an association relationship between a reverse logical lane and a reverse physical lane according to this disclosure.
Figure 6B:
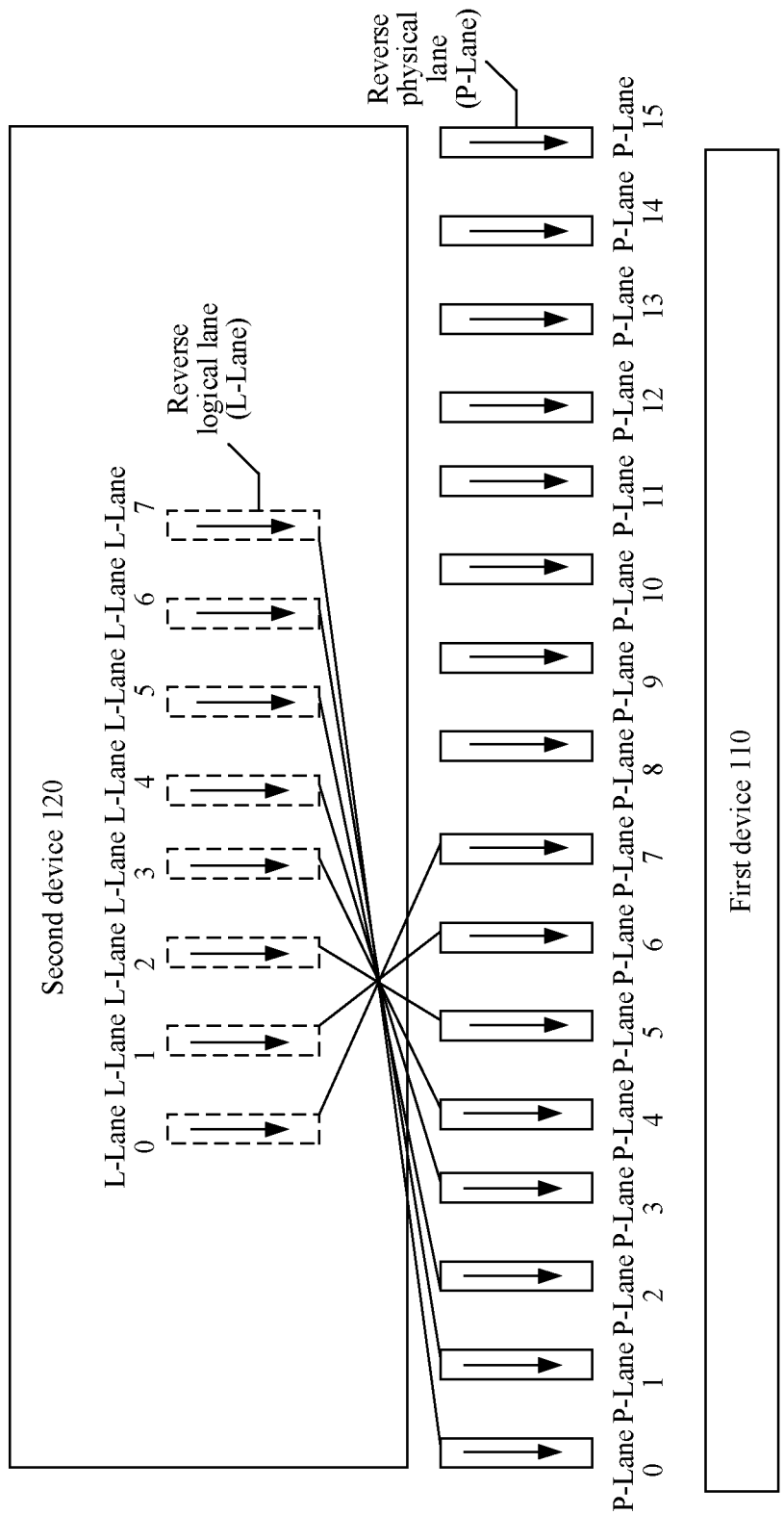

For example, the high-speed serial link has 16 reverse physical lanes. As shown in FIG. 6A, when it is determined that the target reverse logical lane is positioned the eighth reverse physical lane, that is, L-lane 0=P-lane 7, reverse logical lanes after the second reverse logical lane may be one-to-one associated with reverse physical lanes after the eighth reverse physical lane, that is, L-lane 1=P-lane 8, L-lane 2=P-lane 9, L-lane 3=P-lane 10, . . . , and L-lane 7=P-lane 14. As shown in FIG. 6B, the reverse logical lanes after the second reverse logical lane may also be one-to-one associated with the reverse physical lanes before the eighth reverse physical lane, that is, L-lane 1=P-lane 6, L-lane 2=P-lane 5, L-lane 3=P-lane 4, . . . , and L-lane 7=P-lane 0.

It should be noted that, in this case, whether the reverse logical lanes are set in ascending order of the physical lane numbers of the reverse physical lanes or in descending order of the physical lane numbers of the reverse physical lanes needs to be considered with reference to statuses of the reverse physical lanes. Still using the foregoing setting as an example, if an abnormal reverse physical lane exists in the reverse physical lanes after the eighth reverse physical lane, for example, the twelfth reverse physical lane (P-lane 11) is abnormal, the reverse logical lanes after the second reverse logical lane may be one-to-one associated with the reverse physical lanes after the eighth reverse physical lane and before the twelfth reverse physical lane, that is, L-lane 0=P-lane 7, L-lane 1=P-lane 8, L-lane 2=P-lane 9, and L-lane 3=P-lane 10. In this case, a link bandwidth of the high-speed serial link that can be supported is 4. If all reverse physical lanes before the eighth reverse physical lane are normal, reverse logical lanes after the second reverse logical lane may be one-to-one associated with reverse physical lanes before the eighth reverse physical lane, that is, L-lane 1=P-lane 6, L-lane 2=P-lane 5, L-lane 3=P-lane 4, . . . , and L-lane 7=P-lane 0. In this case, a link bandwidth of the high-speed serial link that can be supported is 8. The first device 110 may preferentially select a configuration manner that can maximize the supported link bandwidth of the high-speed serial link.

Manner 2: When the reverse logical lanes need to be set in ascending or descending order of the physical lane numbers of the reverse physical lanes, the peer link configuration policy may indicate a reverse physical lane on which the target reverse logical lane is positioned, a supported link bandwidth of the high-speed serial link, and a setting direction of the reverse logical lanes, where the setting direction indicates that the physical lane numbers of the reverse physical lanes on which the reverse logical lanes ranked according to logical lane numbers are positioned are in ascending or descending order.

If a reverse physical lane set is configured for each reverse logical lane in the reverse logical lane positioning policy, a reverse physical lane on which the target reverse logical lane is positioned is selected from the reverse physical lane set corresponding to the target reverse logical lane. The physical lane numbers of the reverse physical lanes on which the reverse logical lanes ranked according to logical lane numbers are positioned are in ascending or descending order. In addition, with reference to a status of each reverse physical lane, the first device 110 may preferentially select a setting manner that can maximize the supported link bandwidth.

If the reverse logical lane positioning policy indicates a reverse physical lane on which the target reverse logical lane is allowed to be positioned, the reverse physical lane on which the target reverse logical lane is positioned is selected from the reverse physical lanes on which the target reverse logical lane is allowed to be positioned. In addition, with reference to a status of each reverse physical lane, the first device 110 may preferentially select a setting manner that can maximize the supported link bandwidth.

For descriptions of the preferentially selecting, by the first device 110, a configuration manner that can maximize the supported link bandwidth of the high-speed serial link, refer to the foregoing content. Details are not described herein again.

If the high-speed serial link between the second device 120 and the first device 110 is PCIe, when step 302 is performed, the peer link configuration policy may be carried in a TS_2 message that is sent by each transmitter in the first interface 114 of the first device 110 to the second device 120 in the polling phase.

For any transmitter 2Rx i of the first interface 114 of the first device 110, the TS_2 message sent by the transmitter may include the following four pieces of information:

Information 1: a physical lane number of a forward physical lane on which the transmitter is located, for example, carrying P-lane number=i. The information 1 is information that needs to be included in the TS_2 message in the existing polling phase.

Information 2: a reverse physical lane P-lane K on which the target reverse logical lane is located. L-lane 0=P-lane K, Rx K, or Tx K. Rx K is an identifier of a transmitter on the reverse physical lane P-lane K, namely, an identifier of a transmitter in the second interface 124. Tx K is an identifier of a receiver on the reverse physical lane P-lane K, namely, an identifier of a receiver of the first interface 114.

Information 3: a supported link bandwidth R of the high-speed serial link. Linkwidth[index]=R, where index is an identifier of the high-speed serial link.

Information 4: a setting direction of the reverse logical lanes, indicating that physical lane numbers of the reverse physical lanes on which the reverse logical lanes are positioned are in ascending or descending order. In other words, the setting direction of the reverse logical lane indicates whether the reverse logical lanes are sequentially set starting from the target reverse logical lane in an ascending direction of the physical lane numbers or in a descending direction of the physical lane numbers. A physical lane number of the reverse physical lane on which the transmitter is located is Direction[index]=0/1, where 0 may indicate that the setting is performed in an ascending direction of the physical lane numbers, and the finally set ascending direction of the logical lane numbers of the reverse logical lanes is consistent with the ascending direction of the logical lane numbers of the reverse physical lanes. For example, L-lane 0=P-lane 6, L-lane 1=P-lane 7, L-lane 2=P-lane 8, L-lane 3=P-lane 9, and L-lane 4=P-lane 10. In this setting manner, the ascending direction of the logical lane numbers of the reverse logical lanes is consistent with the ascending direction of the logical lane numbers of the reverse physical lanes.

1 may indicate that the setting is performed in a descending direction of the physical lane numbers, and the finally set ascending direction of the logical lane numbers of the reverse logical lanes is opposite to the ascending direction of the logical lane numbers of the reverse physical lanes. For example, L-lane 0=P-lane 7, L-lane 1=P-lane 6, L-lane 2=P-lane 5, and L-lane 3=P-lane 4. In this setting manner, the ascending direction of the logical lane numbers of the reverse logical lanes is opposite to the ascending direction of the logical lane numbers of the reverse physical lanes.

The TS_2 messages sent by the foregoing transmitters are the same except that the information 1 is different. In this manner of setting the TS_2 message, even if there is an abnormal transmitter in the first device 110, it can be ensured that the first device 110 sends the peer link configuration policy to the second device 120 through another normal transmitter.

It should be noted that, in a specific implementation process, the second device 120 is allowed not to perform step 301, that is, the second device 120 may not send the second logical lane positioning message to the first device 110. In other words, the first device 110 may directly determine the peer link configuration policy based on the status of each interface in the first interface 114. Because the first device 110 cannot learn of a reverse physical lane on which the target reverse logical lane is allowed to be positioned, the first device 110 may determine a plurality of peer link configuration policies, and each peer link configuration policy is determined when it is assumed that the target reverse logical lane is positioned on a reverse physical lane. The plurality of peer link configuration policies is a plurality of different peer link configuration policies. A quantity of peer link configuration policies determined by the first device 110 is not limited in embodiments of this disclosure.

Step 307: The first device 110 sends the peer link configuration policy to the second device 120. In embodiments of this disclosure, sending, by the first device 110, the peer link configuration policy to the second device 120 is not limited. For example, the peer link configuration policy may be carried in the TS_2 message in the polling phase, and is transmitted by attaching to a message existing in an existing interaction procedure. For another example, the first device 110 and the second device 120 may set a new message to carry the peer link configuration policy.

Step 308: The second device 120 configures the high-speed serial link between the second device 120 and the first device 110 according to the peer link configuration policy.

The second device 120 may configure an association relationship between a reverse logical lane and a reverse physical lane in the high-speed serial link according to the peer link configuration policy.

It should be noted that, in a specific implementation process, if the first device 110 sends a plurality of peer link configuration policies to the second device 120, the second device 120 may select one peer link configuration policy from the plurality of peer link configuration policies, and configure the association relationship between a reverse logical lane and a reverse physical lane in the high-speed serial link according to the selected peer link configuration policy. For example, the second device 120 may select one peer link configuration policy from the plurality of peer link configuration policies based on a reverse physical lane on which the target reverse logical lane is allowed to be positioned.

Figure 7:
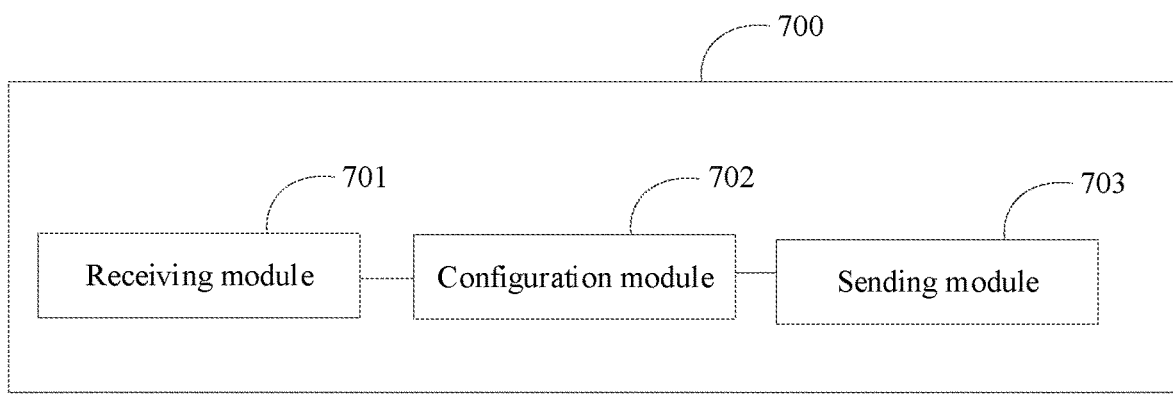
FIG. 7 is a schematic diagram of a structure of a link negotiation apparatus according to this disclosure.

Based on the same concept as the method embodiments, an embodiment of this disclosure further provides a link negotiation apparatus. The link negotiation apparatus may be deployed on a first device. The link negotiation apparatus is configured to perform the method performed by the first device in the method embodiments shown in FIG. 3. For related features, refer to the foregoing method embodiments. Details are not described herein again. As shown in FIG. 7, the link negotiation apparatus 700 includes a receiving module 701 and a configuration module 702. Optionally, the apparatus further includes a sending module 703.

The receiving module 701 is configured to receive a link configuration policy from a second device, where the link configuration policy indicates an association relationship between a unidirectional logical lane and a unidirectional physical lane in a high-speed serial link between the first device and the second device. The unidirectional logical lane is a logical lane from the first device to the second device in the high-speed serial link, and the unidirectional physical lane is a physical lane from the first device to the second device in the high-speed serial link.

The configuration module 702 is configured to configure the high-speed serial link according to the link configuration policy.

In a possible implementation, the sending module 703 may send a logical lane positioning message to the second device. The logical lane positioning message may be expressed in the following two forms.

1. The logical lane positioning message includes a unidirectional physical lane on which a target unidirectional logical lane is allowed to be positioned, where the target unidirectional logical lane is a unidirectional logical lane that is ranked first in the high-speed serial link.

2. The logical lane positioning message includes a unidirectional physical lane on which a plurality of unidirectional logical lanes are allowed to be positioned.

In a possible implementation, the link configuration policy includes some or all of the following: a unidirectional physical lane on which the target unidirectional logical lane is positioned, a link width of the high-speed serial link, and an ascending order of numbers of unidirectional logical lanes in the high-speed serial link follows an ascending order of numbers of unidirectional physical lanes or is opposite to the ascending order of the numbers of the unidirectional physical lanes.

In a possible implementation, the receiving module 701 may receive one or more link configuration policies from the second device.

In a possible implementation, if the receiving module 701 receives a plurality of link configuration policies, the configuration module 702 may select a link configuration policy from the plurality of link configuration policies, and configure the high-speed serial link according to the selected link configuration policy.

In a possible implementation, the first device includes a first interface. The configuration module 702 may determine a peer link configuration policy based on a status of a receiver of the first interface. The peer link configuration policy indicates an association relationship between a first logical lane and a first physical lane in the high-speed serial link between the first device and the second device, where the first logical lane is a logical lane from the second device to the first device in the high-speed serial link, and the first physical lane is a physical lane from the second device to the first device in the high-speed serial link.

The sending module 703 may send the peer link configuration policy to the second device.

Figure 8:
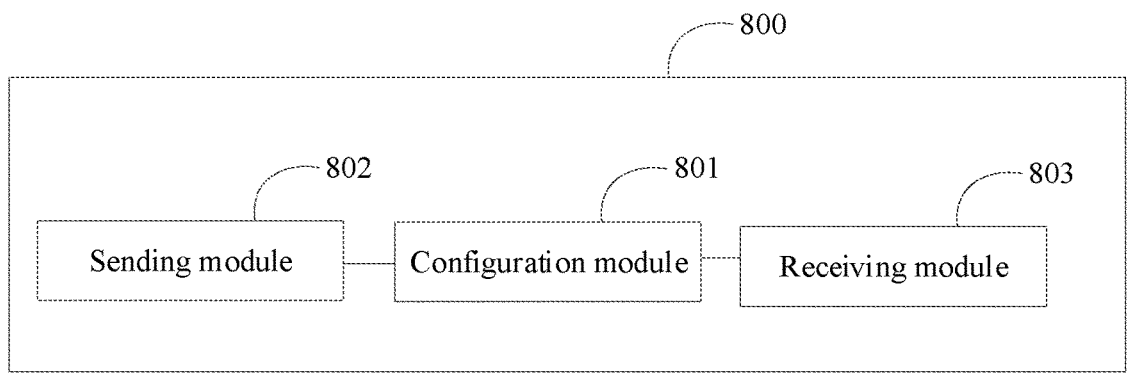
FIG. 8 is a schematic diagram of a structure of a link negotiation apparatus according to this disclosure.

Based on the same concept as the method embodiments, an embodiment of this disclosure further provides a link negotiation apparatus. The link negotiation apparatus may be deployed on a second device, the second device includes a second interface, and a high-speed serial link between the second device and a first device is established based on the second interface. The link negotiation apparatus is configured to perform the method performed by the second device in the method embodiment shown in FIG. 3. For related features, refer to the foregoing method embodiment. Details are not described herein again. As shown in FIG. 8, the link negotiation apparatus 800 includes a configuration module 801 and a sending module 802. Optionally, the apparatus further includes a receiving module 803.

The configuration module 801 is configured to determine a link configuration policy based on a status of a receiver of the second interface, where the link configuration policy indicates an association relationship between a unidirectional logical lane and a unidirectional physical lane in the high-speed serial link between the first device and the second device. The unidirectional logical lane is a logical lane from the first device to the second device in the high-speed serial link, and the unidirectional physical lane is a physical lane from the first device to the second device in the high-speed serial link.

The sending module 802 is configured to send the link configuration policy to the first device.

In a possible implementation, the receiving module 803 is configured to receive a logical lane positioning message from the first device, where the logical lane positioning message may be expressed in the following two forms.

1. The logical lane positioning message includes a unidirectional physical lane on which a target unidirectional logical lane is allowed to be positioned, where the target unidirectional logical lane is a unidirectional logical lane that is ranked first in the high-speed serial link.

2. The logical lane positioning message includes a unidirectional physical lane on which a plurality of unidirectional logical lanes is allowed to be positioned.

In a possible implementation, if the logical lane positioning message is received, when determining the link configuration policy, the configuration module 801 may determine the link configuration policy based on the status of the receiver of the second interface and the logical lane positioning message.

In a possible implementation, the link configuration policy includes some or all of the following: a unidirectional physical lane on which the target unidirectional logical lane is positioned, a link width of the high-speed serial link, and an ascending order of numbers of unidirectional logical lanes in the high-speed serial link follows an ascending order of numbers of unidirectional physical lanes or is opposite to the ascending order of the numbers of the unidirectional physical lanes.

In a possible implementation, the configuration module 801 may determine one or more link configuration policies, and the sending module 802 may send the one or more link configuration policies.

In a possible implementation, the receiving module 803 may further receive a peer link configuration policy from the first device, where the peer link configuration policy indicates an association relationship between a first logical lane and a first physical lane in the high-speed serial link between the first device and the second device. The first logical lane is a logical lane from the second device to the first device in the high-speed serial link, and the first physical lane is a physical lane from the second device to the first device in the high-speed serial link.

The configuration module 801 may configure the high-speed serial link according to the peer link configuration policy.

It should be noted that, in embodiments of this disclosure, module division is an example, and is merely a logical function division. In actual implementation, another division manner may be used. Functional modules in embodiments of this disclosure may be integrated into one processing module, or each of the modules may exist alone physically, or two or more modules are integrated into one module. The integrated module may be implemented in a form of hardware, or may be implemented in a form of a software functional module.

All or some of the foregoing embodiments may be implemented by software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), or a semiconductor medium. The semiconductor medium may be a solid-state drive (SSD).

In a simple embodiment, a person skilled in the art may figure out that the second device in the embodiment shown in FIG. 3 or the evaluation apparatus shown in FIG. 7 may be in the form of the first device shown in FIG. 2. A processor 112, an internal memory 113, and a communication interface (for example, a first interface 114) are included. For descriptions of the processor 112, the internal memory 113, and the first interface 114, refer to the foregoing content. Details are not described herein again.

In a simple embodiment, a person skilled in the art may figure out that the second device in the embodiment shown in FIG. 3 or the evaluation apparatus shown in FIG. 8 may be in the form of the second device shown in FIG. 2. A processor 122, an internal memory 123, and a communication interface (for example, a second interface 124) are included. For descriptions of the processor 122, the internal memory 123, and the second interface 124, refer to the foregoing content. Details are not described herein again.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a compact disc (CD) read-only memory (ROM) (CD-ROM), an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the other programmable device, so that computer-implemented processing is generated. Therefore, the instructions executed on the computer or the other programmable device provide steps for implementing a specific function in one or more procedures in the flowcharts and/or in one or more blocks in the block diagrams.

It is clear that a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A system comprising:
   a first device configured to:
      receive a link configuration policy, wherein the link configuration policy indicates an association relationship between a first unidirectional logical lane and a first unidirectional physical lane; and
      configure a high-speed serial link according to the link configuration policy; and
   a second device comprising a first interface configured to:
      couple to the first device with the high-speed serial link, and send the link configuration policy to the first device based on a status of a receiver of the first interface,
wherein the link configuration policy comprises a physical lane on which the receiver detects a pulse for positioning an associated forward logical lane, and the link configuration policy excludes any physical lane on which detecting the pulse is less clearly or easily detected,
wherein the first unidirectional logical lane is from the first device to the second device in the high-speed serial link, and
wherein the first unidirectional physical lane is from the first device to the second device in the high-speed serial link.

2. The system of claim 1, wherein the first device is further configured to send a logical lane positioning message to the second device, wherein the logical lane positioning message comprises a second unidirectional physical lane on which a target unidirectional logical lane is allowed to be positioned, and wherein the target unidirectional logical lane is ranked first in the high-speed serial link.

3. The system of claim 1, wherein the first device is further configured to send a logical lane positioning message to the second device, and wherein the logical lane positioning message comprises a second unidirectional physical lane on which second unidirectional logical lanes are allowed to be positioned.

4. The system of claim 2, wherein the second device is further configured to determine the link configuration policy based on the status of the receiver and the logical lane positioning message.

5. The system of claim 1, wherein the link configuration policy is based on:
a second unidirectional physical lane on which a target unidirectional logical lane is positioned, wherein the target unidirectional logical lane is a second unidirectional logical lane that is ranked first in the high-speed serial link;
a link width of the high-speed serial link; or
an ascending order of numbers of third unidirectional logical lanes in the high-speed serial link follows an ascending order of numbers of third unidirectional physical lanes or is opposite to the ascending order of the numbers of the third unidirectional physical lanes.

6. The system of claim 1, wherein the second device is further configured to send a plurality of link configuration policies to the first device based on the status of the receiver.

7. The system of claim 6, wherein the first device is further configured to select the link configuration policy from the plurality of link configuration policies.

8. The system of claim 1, wherein the first device comprises a second interface, wherein the first device is further configured to send a peer link configuration policy to the second device based on a status of a receiver of the second interface, wherein the peer link configuration policy indicates an association relationship between a second logical lane and a second physical lane in the high-speed serial link, wherein the second logical lane is from the second device to the first device in the high-speed serial link, wherein the second physical lane is from the second device to the first device in the high-speed serial link, and wherein the second device is further configured to configure the high-speed serial link according to the peer link configuration policy.

9. A method implemented by a first device, wherein the method comprises:
receiving a link configuration policy from a second device, wherein the link configuration policy indicates an association relationship between a first unidirectional logical lane and a first unidirectional physical lane in a high-speed serial link between the first device and the second device, wherein the link configuration policy comprises a physical lane on which a receiver of the second device detects a pulse for positioning an associated forward logical lane, and the link configuration policy excludes any physical lane on which detecting the pulse is less clearly or easily detected, wherein the first unidirectional logical lane is from the first device to the second device in the high-speed serial link, and wherein the first unidirectional physical lane is from the first device to the second device in the high-speed serial link; and
configuring the high-speed serial link according to the link configuration policy.

10. The method of claim 9, wherein before receiving the link configuration policy, the method further comprises sending a logical lane positioning message to the second device, wherein the logical lane positioning message comprises a second unidirectional physical lane on which a target unidirectional logical lane is allowed to be positioned, and wherein the target unidirectional logical lane is ranked first in the high-speed serial link.

11. The method of claim 9, wherein before receiving the link configuration policy, the method further comprises sending a logical lane positioning message to the second device, and wherein the logical lane positioning message comprises a second unidirectional physical lane on which second unidirectional logical lanes are allowed to be positioned.

12. The method of claim 9, wherein the link configuration policy is based on:
a second unidirectional physical lane on which a target unidirectional logical lane is positioned, wherein the target unidirectional logical lane is a second unidirectional logical lane that is ranked first in the high-speed serial link;
a link width of the high-speed serial link; or
an ascending order of numbers of third unidirectional logical lanes in the high-speed serial link follows an ascending order of numbers of third unidirectional physical lanes or is opposite to the ascending order of the numbers of the third unidirectional physical lanes.

13. The method of claim 9, wherein receiving the link configuration policy comprises receiving a plurality of link configuration policies from the second device.

14. The method of claim 13, further comprising selecting the link configuration policy from the plurality of link configuration policies.

15. The method of claim 9, further comprising sending a peer link configuration policy to the second device based on a status of a receiver of an interface of the first device, wherein the peer link configuration policy indicates an association relationship between a second logical lane and a second physical lane in the high-speed serial link between the first device and the second device, wherein the second logical lane is from the second device to the first device in the high-speed serial link, and wherein the second physical lane is from the second device to the first device in the high-speed serial link.

16. A first device comprising:
a storage configured to store instructions; and
a processor coupled to the storage and configured to execute the instructions to cause the first device to:
receive a link configuration policy from a second device, wherein the link configuration policy indicates an association relationship between a first unidirectional logical lane and a first unidirectional physical lane in a high-speed serial link between the first device and the second device, wherein the link configuration policy comprises a physical lane on which a receiver of the second device detects a pulse for positioning an associated forward logical lane, and the link configuration policy excludes any physical lane on which detecting the pulse is less clearly or easily detected, wherein the first unidirectional logical lane is from the first device to the second device in the high-speed serial link, and wherein the first unidirectional physical lane is from the first device to the second device in the high-speed serial link; and configure the high-speed serial link according to the link configuration policy.

17. The first device of claim 16, wherein before receiving the link configuration policy, the processor is further configured to execute the instructions to cause the first device to send a logical lane positioning message to the second device, wherein the logical lane positioning message comprises a second unidirectional physical lane on which a target unidirectional logical lane is allowed to be positioned, and wherein the target unidirectional logical lane is ranked first in the high-speed serial link.

18. The first device of claim 16, wherein before receiving the link configuration policy, the processor is further configured to execute the instructions to cause the first device to send a logical lane positioning message to the second device, and wherein the logical lane positioning message comprises a second unidirectional physical lane on which second unidirectional logical lanes are allowed to be positioned.

19. The first device of claim 16, wherein the link configuration policy is based on:
   a second unidirectional physical lane on which a target unidirectional logical lane is positioned, wherein the target unidirectional logical lane is a second unidirectional logical lane that is ranked first in the high-speed serial link;
   a link width of the high-speed serial link; or
   an ascending order of numbers of third unidirectional logical lanes in the high-speed serial link follows an ascending order of numbers of third unidirectional physical lanes or is opposite to the ascending order of the numbers of the third unidirectional physical lanes.

20. The first device of claim 16, wherein the processor is further configured to execute the instructions to cause the first device to receive a plurality of link configuration policies from the second device.

* * * * *